United States Patent
Rutkowski et al.

(10) Patent No.: US 11,253,958 B2
(45) Date of Patent: Feb. 22, 2022

(54) POLYMER FILM HEAT EXCHANGER SEALING SYSTEM AND METHOD

(71) Applicant: Treau, Inc., San Francisco, CA (US)

(72) Inventors: Adam Rutkowski, San Francisco, CA (US); Grace Li, San Francisco, CA (US); Peter Sturt Lynn, Alameda, CA (US); Adrien Benusiglio, San Francisco, CA (US); Vincent Domenic Romanin, San Francisco, CA (US); Jason Stein Wexler, San Francisco, CA (US); Bataung Mohapi, Berkeley, CA (US)

(73) Assignee: TREAU, INC., San Francisco, CA (US)

( * ) Notice: Subject to any disclaimer, the term of this patent is extended or adjusted under 35 U.S.C. 154(b) by 2 days.

(21) Appl. No.: 16/774,946

(22) Filed: Jan. 28, 2020

(65) Prior Publication Data
US 2020/0238451 A1    Jul. 30, 2020

Related U.S. Application Data

(60) Provisional application No. 62/798,376, filed on Jan. 29, 2019.

(51) Int. Cl.
  *B23P 15/26* (2006.01)
  *F28F 11/00* (2006.01)
(52) U.S. Cl.
  CPC ............... *B23P 15/26* (2013.01); *F28F 11/00* (2013.01)

(58) Field of Classification Search
  CPC . F28F 2275/06; F28F 21/065; B29C 65/3468; B29L 2031/18
  See application file for complete search history.

(56) References Cited

U.S. PATENT DOCUMENTS

| | | |
|---|---|---|
| 1,183,077 A | 5/1916 | Koenig |
| 1,926,463 A | 9/1933 | Stoddard |
| 2,252,064 A | 8/1941 | Cornell, Jr. |

(Continued)

FOREIGN PATENT DOCUMENTS

| | | |
|---|---|---|
| CA | 2338240 A1 | 12/2000 |
| CA | 2409963 A1 | 5/2003 |

(Continued)

OTHER PUBLICATIONS

EP-2835610-A1 Machine Translation (Year: 2015).*

(Continued)

*Primary Examiner* — Jacob J Cigna
*Assistant Examiner* — Michael W Hotchkiss
(74) *Attorney, Agent, or Firm* — Davis Wright Tremaine LLP

(57) ABSTRACT

A method of manufacturing a heat exchanger array that includes stacking a plurality of heat exchanger units in an aligned configuration with respective first ports of the plurality of heat exchanger units aligned. The method can further include generating heat in the first coupling elements at the same time and at a temperature sufficient to generate a first plurality of respective couplings between adjacent sheets of adjacent heat exchanger units about adjacent first ports and without a coupling being generated between the first and second sheets of a given heat exchanger unit.

17 Claims, 13 Drawing Sheets

(56) References Cited

U.S. PATENT DOCUMENTS

| | | | |
|---|---|---|---|
| 2,810,053 A * | 10/1957 | Messner | H05B 6/365 |
| | | | 219/635 |
| 2,817,340 A | 12/1957 | Cuvier | |
| 3,201,861 A | 8/1965 | Fromson | |
| 3,530,681 A | 9/1970 | Dehne | |
| 3,537,935 A | 11/1970 | Withers | |
| 3,751,904 A | 8/1973 | Rydberg | |
| 3,827,675 A | 8/1974 | Schuman | |
| 3,862,546 A | 1/1975 | Daniels | |
| 3,986,360 A | 10/1976 | Hagen et al. | |
| 4,242,878 A | 1/1981 | Brinkerhoff | |
| 4,377,203 A | 3/1983 | Ejima | |
| 4,393,662 A | 7/1983 | Dirth | |
| 4,411,310 A * | 10/1983 | Perry | B29C 65/18 |
| | | | 165/166 |
| 4,455,825 A | 6/1984 | Pinto | |
| 4,490,974 A | 1/1985 | Colgate | |
| 4,619,112 A | 10/1986 | Colgate | |
| 4,641,503 A | 2/1987 | Kobayashi | |
| 4,733,718 A * | 3/1988 | Schikowsky | B29C 65/18 |
| | | | 156/73.5 |
| 4,744,414 A * | 5/1988 | Schon | F28F 3/083 |
| | | | 165/167 |
| 4,809,516 A | 3/1989 | Jones | |
| 4,859,265 A * | 8/1989 | Shuster | B29C 66/723 |
| | | | 156/292 |
| 4,871,017 A * | 10/1989 | Cesaroni | F28D 1/035 |
| | | | 165/170 |
| 4,907,648 A * | 3/1990 | Emmerich | B27N 5/02 |
| | | | 165/166 |
| 4,955,435 A * | 9/1990 | Shuster | F28D 1/035 |
| | | | 165/170 |
| 5,138,765 A | 8/1992 | Watson et al. | |
| 5,195,240 A * | 3/1993 | Shuster | B29C 49/0047 |
| | | | 29/890.039 |
| 5,222,551 A * | 6/1993 | Hasegawa | F28D 9/005 |
| | | | 165/167 |
| 5,245,835 A | 9/1993 | Cohen et al. | |
| 5,337,563 A | 8/1994 | Weber | |
| 5,355,688 A | 10/1994 | Rafalovich et al. | |
| 5,385,204 A * | 1/1995 | Boardman | B23K 20/18 |
| | | | 165/170 |
| 5,445,213 A | 8/1995 | Im | |
| 5,467,812 A | 11/1995 | Dean et al. | |
| 5,507,337 A | 4/1996 | Rafalovich et al. | |
| 5,682,752 A | 11/1997 | Dean | |
| 5,813,235 A | 9/1998 | Peterson | |
| 5,954,125 A | 9/1999 | Mantegazza et al. | |
| 5,988,269 A * | 11/1999 | Karlsson | F28D 9/005 |
| | | | 165/167 |
| 6,032,730 A * | 3/2000 | Akita | F24F 12/006 |
| | | | 165/166 |
| 6,138,987 A | 10/2000 | Lee | |
| 6,286,316 B1 | 9/2001 | Waldrop et al. | |
| 6,318,108 B1 | 11/2001 | Holstein et al. | |
| 6,332,323 B1 | 12/2001 | Reid et al. | |
| 6,343,482 B1 | 2/2002 | Endo et al. | |
| 6,389,834 B1 | 5/2002 | LeClear et al. | |
| 6,397,940 B1 * | 6/2002 | Blomgren | B21D 53/04 |
| | | | 165/166 |
| 6,482,332 B1 | 11/2002 | Malach | |
| 6,525,505 B2 | 2/2003 | Bay et al. | |
| 6,840,056 B2 | 1/2005 | Tanaka | |
| 6,857,468 B2 | 2/2005 | Emrich | |
| 7,140,107 B2 | 11/2006 | Ohno et al. | |
| 7,143,823 B2 | 12/2006 | Kang et al. | |
| 7,198,093 B1 | 4/2007 | Elkins | |
| 7,243,703 B2 | 7/2007 | Yamaguchi et al. | |
| 7,467,467 B2 | 12/2008 | Prociw | |
| 7,802,426 B2 | 9/2010 | Bollinger | |
| 8,061,411 B2 | 11/2011 | Xu et al. | |
| 8,281,614 B2 | 10/2012 | Koo et al. | |
| 8,650,886 B2 | 2/2014 | Wilcoxon et al. | |
| 8,967,239 B2 | 3/2015 | Schertz et al. | |
| 9,140,273 B2 | 9/2015 | Stroganov | |
| 9,234,480 B2 | 1/2016 | Gayton | |
| 9,618,278 B2 * | 4/2017 | Denkenberger | B29C 66/1122 |
| 9,648,983 B2 | 5/2017 | Hofer et al. | |
| 10,012,450 B2 | 7/2018 | Riendeau | |
| 10,533,810 B2 * | 1/2020 | Lynn | F04B 39/12 |
| 2002/0026800 A1 | 3/2002 | Kasai et al. | |
| 2002/0166657 A1 * | 11/2002 | Uchison | F28D 9/0025 |
| | | | 165/165 |
| 2003/0110789 A1 | 6/2003 | Cur et al. | |
| 2004/0003915 A1 | 1/2004 | Shippy et al. | |
| 2004/0050532 A1 | 3/2004 | Yamaguchi et al. | |
| 2005/0092474 A1 * | 5/2005 | Seidel | B23K 31/12 |
| | | | 165/166 |
| 2006/0107683 A1 | 5/2006 | Song et al. | |
| 2006/0157225 A1 | 7/2006 | Martin et al. | |
| 2007/0034623 A1 * | 2/2007 | Mimken | B29C 66/43441 |
| | | | 219/600 |
| 2008/0087031 A1 | 4/2008 | Park et al. | |
| 2009/0071181 A1 | 3/2009 | Spanger | |
| 2009/0194268 A1 * | 8/2009 | Kristensen | B29C 65/02 |
| | | | 165/185 |
| 2014/0007569 A1 | 1/2014 | Gayton | |
| 2014/0124187 A1 * | 5/2014 | Albalat | F28F 21/08 |
| | | | 165/185 |
| 2014/0150656 A1 | 6/2014 | Vandermeulen | |
| 2015/0323260 A1 | 11/2015 | Greber | |
| 2016/0231071 A1 | 8/2016 | Sekol et al. | |
| 2016/0341224 A1 | 11/2016 | Lynn et al. | |
| 2016/0341498 A1 | 11/2016 | Lynn et al. | |
| 2017/0194679 A1 * | 7/2017 | Chakraborty | F28F 3/12 |
| 2017/0205146 A1 | 7/2017 | Turney et al. | |
| 2018/0283794 A1 | 10/2018 | Cerny et al. | |
| 2018/0283795 A1 | 10/2018 | Cerny et al. | |
| 2019/0107338 A1 * | 4/2019 | Romanin | F28D 7/10 |
| 2020/0238452 A1 * | 7/2020 | Rutkowski | F28F 11/00 |

FOREIGN PATENT DOCUMENTS

| | | | | |
|---|---|---|---|---|
| DE | 1259362 B | | 1/1968 | |
| DE | 3212295 A1 * | 10/1983 | | B29C 65/3444 |
| DE | 4007963 A1 | | 9/1991 | |
| EP | 0052321 A1 | | 5/1982 | |
| EP | 0925168 B1 * | 8/2001 | | B29C 65/3656 |
| EP | 1779965 A2 | | 5/2007 | |
| EP | 1779965 B1 | | 9/2012 | |
| EP | 2835610 A1 * | 2/2015 | | B29C 66/12469 |
| FR | 2848653 A1 | | 6/2004 | |
| RU | 2100733 C1 | | 12/1997 | |
| RU | 2413152 C2 | | 2/2011 | |
| RU | 2487270 C2 | | 7/2013 | |
| UA | 88281 U | | 3/2014 | |
| WO | 2006134716 A1 | | 12/2006 | |
| WO | 2007144498 A2 | | 12/2007 | |
| WO | 2008108724 A3 | | 11/2008 | |

OTHER PUBLICATIONS

DE-3212295-A1 Machine Translation (Year: 1983).*
EP-0925168-B1 Machine Translation (Year: 2001).*
U.S. Appl. No. 16/774,970, filed Jan. 28, 2020.
U.S. Appl. No. 15/161,029, filed May 20, 2016.
U.S. Appl. No. 15/161,064, filed May 20, 2016.
U.S. Appl. No. 17/197,910, filed Mar. 10, 2021.
U.S. Appl. No. 16/156,364, filed Oct. 10, 2018.
U.S. Appl. No. 16/156,426, filed Oct. 10, 2018.
U.S. Appl. No. 17/072,584, filed Oct. 16, 2020.
"APTIV® Victrex® Peek Film Technology: High Performance Film for Unmatched Versatility and Performance," Victrex Polymer Solutions, brochure first published 2012, last modified 2014.
Denkenberger et al., "Expanded microchannel heat exchanger: design, fabrication and preliminary experimental test," Proceedings of the Institution of Mechanical Engineers—Part A: Journal of Power and Energy 226(4):532-544 , Apr. 11, 2012.
International Search Report and Written Opinion dated Dec. 13, 2018, International Patent Application No. PCT/US2018/055294, filed Oct. 10, 2018, 6 pages.

(56) References Cited

OTHER PUBLICATIONS

International Search Report and Written Opinion dated May 28, 2020, International Patent Application No. PCT/US2020/015463, filed Jan. 28, 2020, 6 pages.
International Search Report and Written Opinion dated Sep. 1, 2016, International Patent Application No. PCT/US2016/033659, filed May 20, 2016.
International Search Report and Written Opinion dated Sep. 15, 2016, International Patent Application No. PCT/US2016/033655, filed May 20, 2016.
Scheffler et al., "Fabrication of polymer film heat transfer elements for energy efficient multi-effect distillation," Desalination 222(1-3):696-710, Mar. 1, 2008.
Zaheed et al., "Review of polymer compact heat exchangers, with special emphasis on a polymer film unit," Applied Thermal Engineering 24(16):2323-2358, published online Jun. 2, 2004, print publication Nov. 30, 2004.
International Search Report and Written Opinion dated Sep. 2, 2021, Patent Application No. PCT/US2021/039932, 7 pages.

* cited by examiner

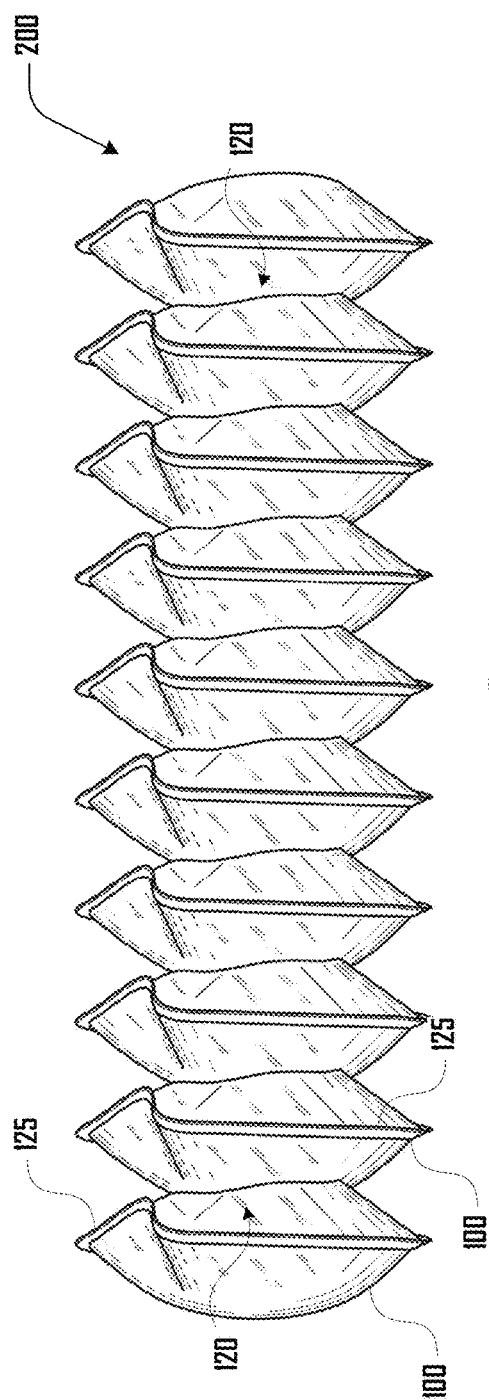
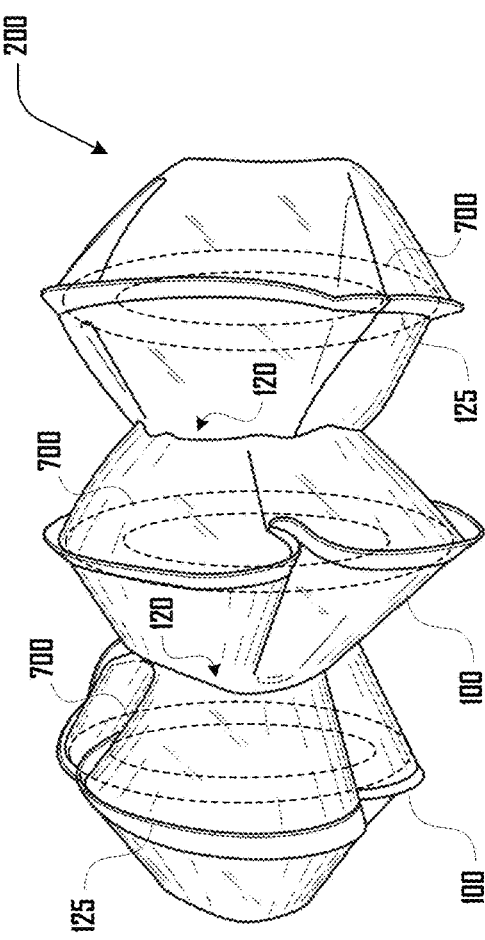

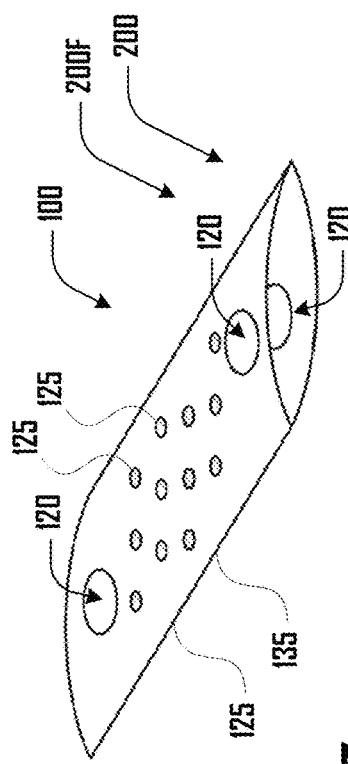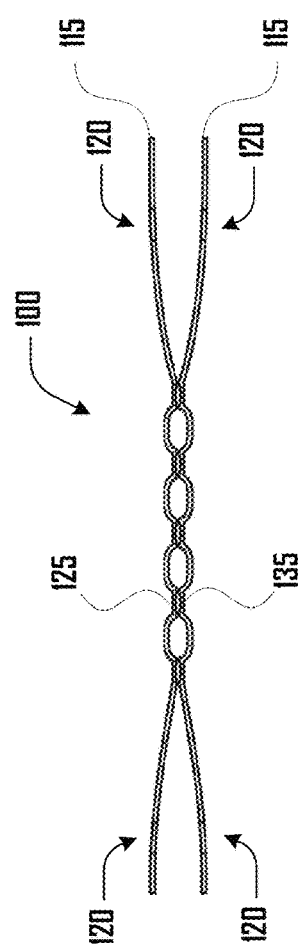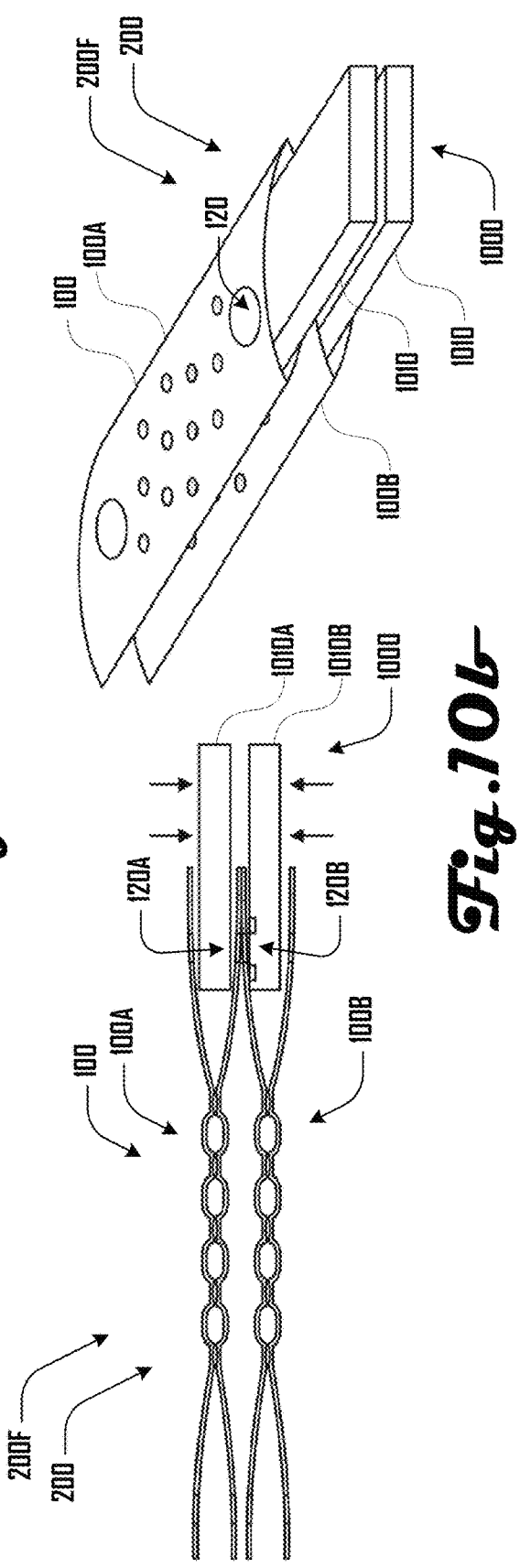
Fig.10a
Fig.10b

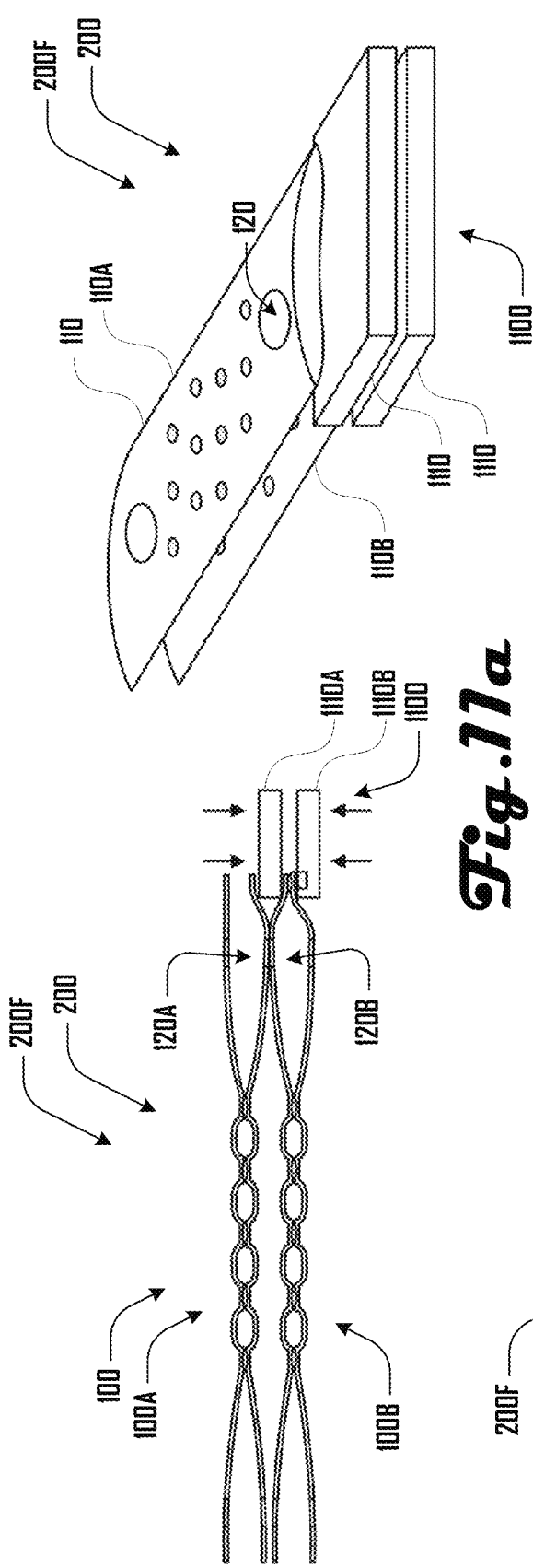
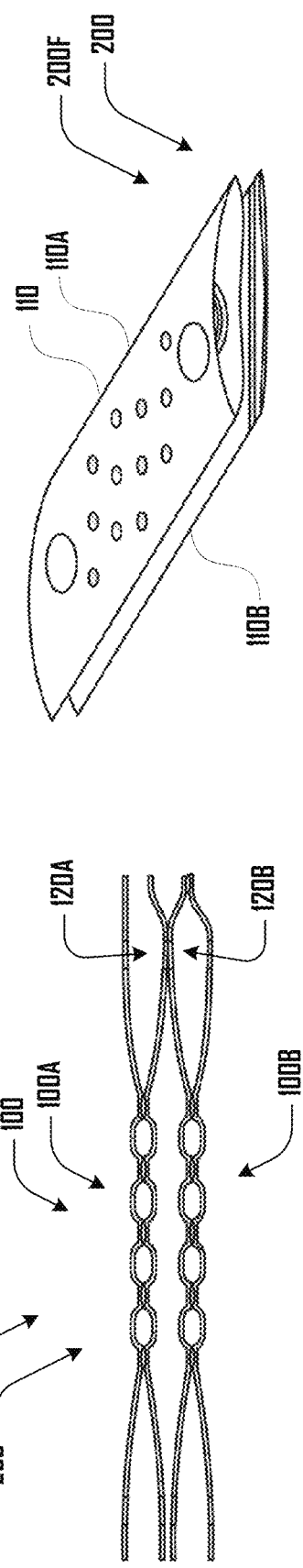
Fig. 11a
Fig. 11b

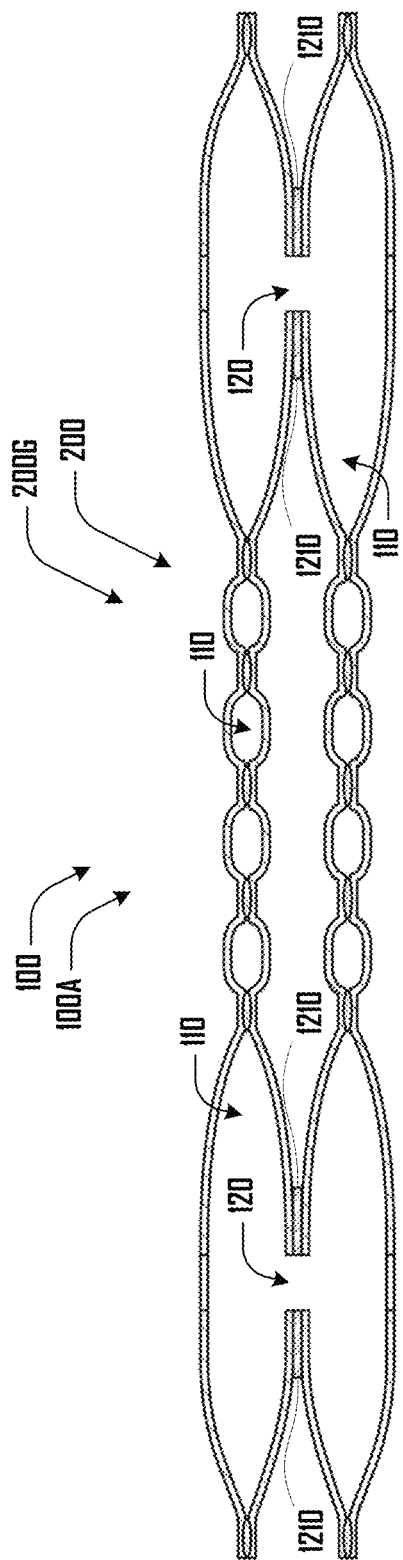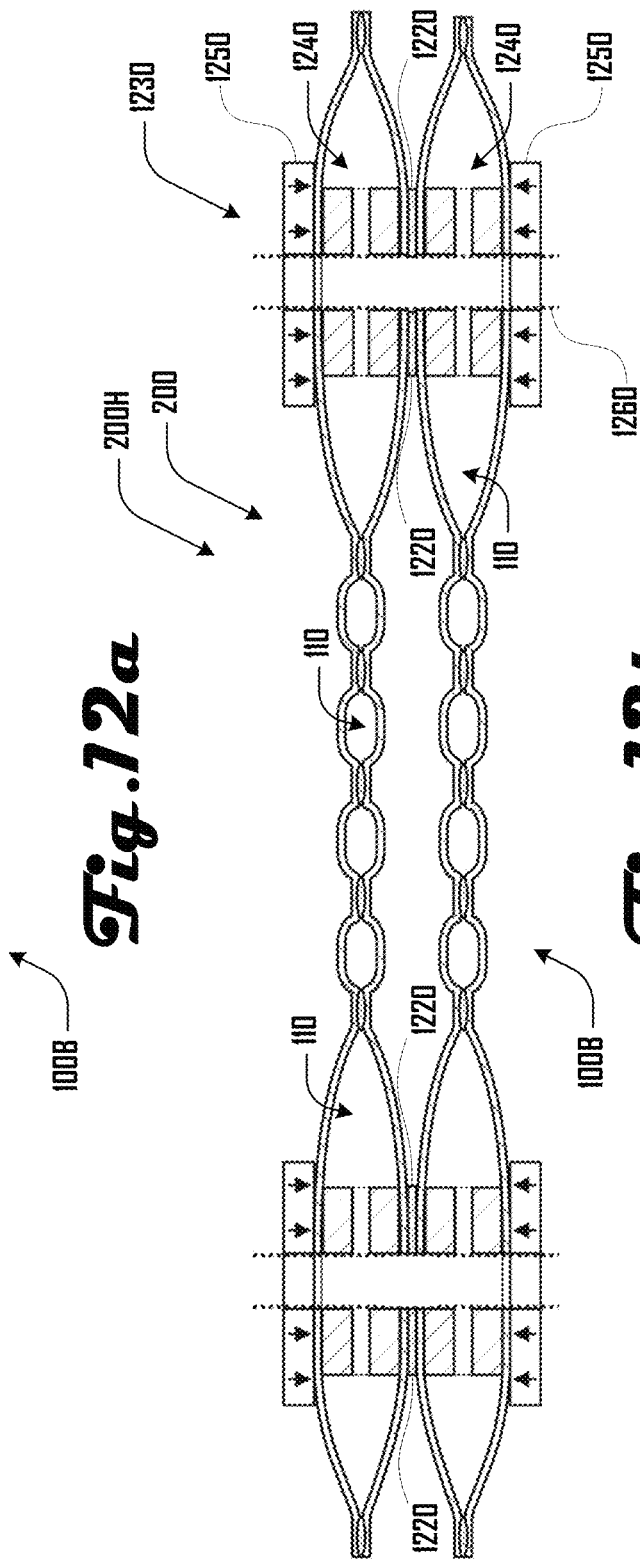

POLYMER FILM HEAT EXCHANGER SEALING SYSTEM AND METHOD

CROSS-REFERENCE TO RELATED APPLICATIONS

This application is a non-provisional of and claims the benefit of U.S. Provisional Application No. 62/798,376, filed Jan. 29, 2019, which application is hereby incorporated herein by reference in its entirety and for all purposes.

This application is related to U.S. patent application Ser. No. 15/161,029 entitled "Membrane heat exchanger system and method" filed May 20, 2016, and is related to U.S. application Ser. No. 16/156,364 filed Oct. 10, 2018, entitled "Conformable Heat Exchanger System And Method," which applications, along with continuations thereof, are hereby incorporated herein by reference in their entirety and for all purposes.

STATEMENT REGARDING FEDERALLY SPONSORED RESEARCH

This invention was made with Government support under contract number DE-SC0018536 awarded by DOE, Office of Science. The Government has certain rights in this invention.

BACKGROUND

Conventional heat exchangers can be made using high-conductivity metals such as copper and aluminum which separate the heat exchange fluids using tubes that are brazed or welded together to form a sealed system. The manifolding of metal tube or microchannel heat exchangers can have significant effect on the manufacturing cost and the ultimate heat transfer performance of the heat exchanger by affecting parameters like pressure drop and flow distribution.

For example, in the manufacturing of finned-tube heat exchangers commonly employed in liquid-to-air heat transfer, individual tubes can be inserted between fins and then expanded in order to make good thermal contact, and then "u"-fittings are brazed on in a specified pattern in order to form the liquid flow path. Because tubes are connected in series rather than in parallel, it can be a difficult task to determine the optimal refrigerant flow path for best heat transfer in a particular heat exchanger. In addition, connecting these tubes in series can result in a higher pressure drop than is necessary due to the long flow path and requires greater pumping power than a parallel flow configuration.

Conventional heat exchangers can be made from the assembly of one or more rigid tubes or channels, where one fluid flows over, around, or outside of the tubes/channels and another fluid flows inside. The purpose of such tubes/channels is to facilitate heat transfer from one fluid to the other. Common types of heat exchangers include shell-and-tube, plate, tube-fin, microchannel-fin, and pillow plate heat exchangers. In nearly all of these common types, the physical shape and configuration is partially or completely determined by the construction method of the heat exchanger. For example, cylinders are common for shell-and-tube heat exchangers and boxes are common for most other types. Furthermore, the shape and size of the heat exchanger are fixed after manufacture, and cannot change during installation or operation.

Conventional fin-and-tube heat exchangers, (e.g., car radiators), are highly constrained in geometric layout and do not fit well into confined volumes of arbitrary shape. The result of this is that systems which use conventional heat exchangers require such heat exchangers to be specifically designed to accommodate physical shape requirements of the system. If heat exchangers were able to change in size or adapt to different sizes and shapes, the configurations of systems that use heat exchangers would have more design flexibility and, consequently, more opportunities for performance improvement. Accordingly, there is a need for flexible heat exchanger systems that provide for improved design flexibility and opportunities for performance improvement.

In various embodiments, the temperature difference $\Delta T$ across a heat exchanger directly equates to a loss in exergy. After accounting for the $\Delta T$ across a heat exchanger, the Carnot coefficients of performance for heat pumps in cooling and heating systems become:

$$COP_{cooling} = \frac{T_c - \Delta T}{(T_h + \Delta T) - (T_c - \Delta T)}$$

$$COP_{heating} = \frac{T_h + \Delta T}{(T_h + \Delta T) - (T_c - \Delta T)}$$

where $T_h$ and $T_c$ are hot and cold temperatures at either end of the system and $\Delta T$ is the additional temperature difference required to transfer heat to the air through a heat exchanger. However, $\Delta T$ is constrained by the need to exchange heat at a sufficient rate; this heat flux from one fluid, through a wall, into a second fluid is a function of the combined heat transfer due to convection in both fluids and conduction and is given by $$Q = h_1 A \Delta T_1$$
$$Q = h_2 A \Delta T_2$$
$$Q = \frac{k A \Delta T_3}{t} \Rightarrow Q = \frac{A \Delta T}{\frac{1}{h_1} + \frac{1}{h_2} + \frac{t}{k}}$$

where A is the surface area of the heat exchanger, t is the wall thickness, k is the thermal conductivity of the material, $h_1$ and $h_2$ are the heat transfer coefficients of either fluid, and Q is the heat transfer.

Power plants and other implementations are similarly limited by heat exchanger $\Delta T$ via the Carnot efficiency $$\eta = \frac{T_h - (T_c + \Delta T)}{T_h}$$

In various embodiments, laminar flow heat transfer and flow losses are approximated by $$Q = \frac{Nu k A \Delta T}{d} \quad P_{fan} = \frac{8 A \mu v^2}{d}$$

where Nu is the Nusselt number, d is the effective tube diameter, $P_{fan}$ is the required fan power, $\mu$ is the viscosity, and v is the fluid velocity.

The heat transfer rate in a heat exchanger can be directly proportional to the surface area in the heat exchanger. Increasing the surface area can increase the overall heat transfer, thereby increasing performance. This can be impractical with conventional heavy metallic heat exchangers. Additionally, conventional metallic heat exchangers become fragile and corrosion sensitive at small thicknesses.

Metallic fin-and-tube heat exchangers, similar to automotive radiators, are the current standard for conventional heat exchangers. Most metals have high densities and become fragile and corrosion sensitive at thin film thicknesses. Thus, metallic heat exchangers are heavier and more expensive than otherwise required for a given operating pressure or desired heat transfer rate and typically rely on high-power fans which reduce efficiency.

In view of the foregoing, a need exists for improved heat exchangers, and an improved system and method for manufacturing the same, in an effort to overcome the aforementioned obstacles and deficiencies of conventional heat exchanger systems and methods of manufacturing the same.

BRIEF DESCRIPTION OF THE DRAWINGS

FIG. 8a illustrates an example of a structure resulting from coupling of adjacent ports of adjacent heat exchanger units.

FIG. 8b illustrates an example of a structure resulting from coupling of adjacent ports of adjacent heat exchanger units with a set of patches remaining within coupled units.

FIG. 10a illustrates a side cross-sectional view and perspective view of a heat exchanger unit comprising a pair of sheets coupled peripherally via seams that define a peripheral edge that forms the enclosed chamber.

FIG. 10b illustrates a first and second heat exchanger unit in a stacked configuration with the ports of the respective heat exchanger units being aligned and a heating element having first and second portions inserted into an open end of the first and second heat exchanger unit.

FIG. 11a illustrates the first and second portions of the heating element being applied to the open end of the second heat exchange unit where the weld was applied about the first and second ports as shown in FIG. 10b.

FIG. 11b illustrates an example resulting structure where first and second portions of the heating element applied to the open end of the second heat exchange unit generate a weld to the end of the second heat exchange unit to close and seal the end of the second heat exchange unit as shown in FIG. 11a.

For example, FIG. 12a illustrates another embodiment of a heat exchanger array having a first and second heat exchanger unit in a stacked configuration with the ports aligned and with the respective sheets about the ports of respective sheets coupled via an adhesive.

FIG. 12b illustrates a further embodiment of a heat exchanger array having a first and second heat exchanger unit in a stacked configuration with the ports aligned and with the respective sheets about the ports of respective sheets coupled about the ports via a gasket with a clamp assembly applying sealing pressure to the gasket to generate a seal.

Figure 1:
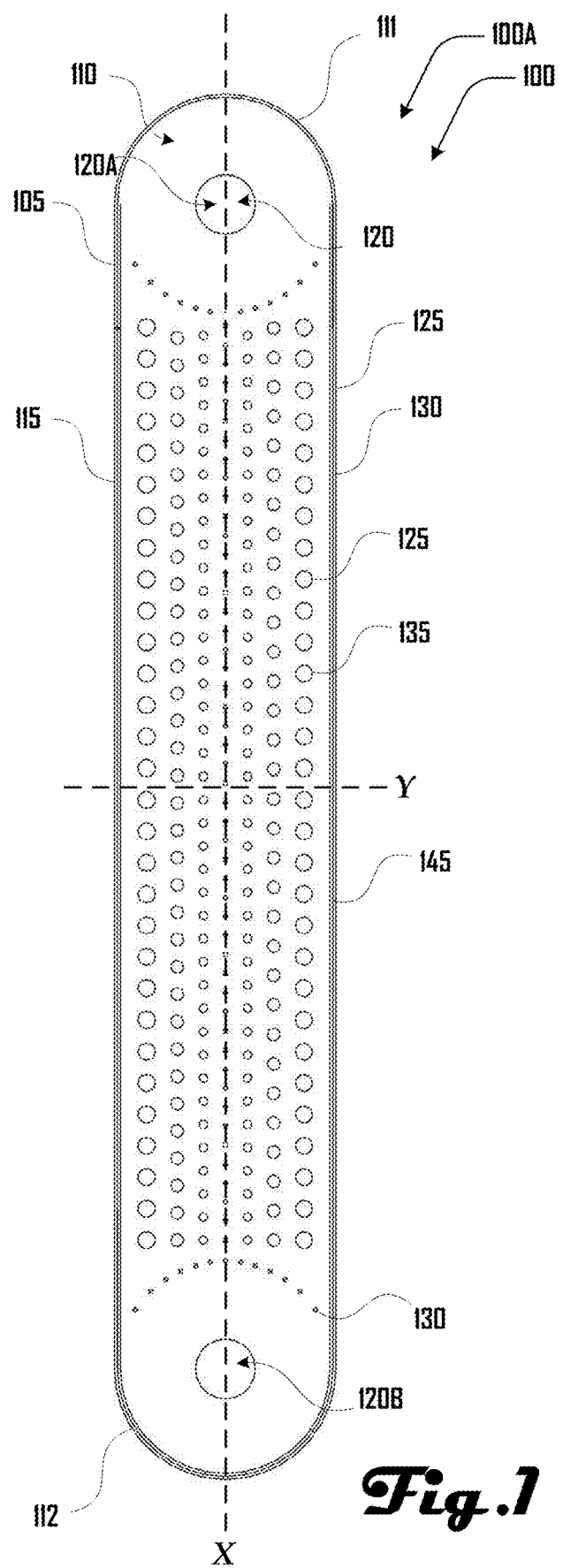
FIG. 1 is a top view of a heat exchanger unit in a flat configuration in accordance with one embodiment.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Heat exchangers made from thin-walled polymer film materials can have a wide range of benefits over metal heat exchangers by having similar heat transfer coefficients and using a less expensive material while also having benefits for corrosion resistance. An additional advantage of using polymer films in some examples can be that unique geometries can be made from these materials which could not be easily manufactured using metals. A range of thermal sealing methods allow for the welding of films together for heat exchange elements, but new techniques may be required for consistent and reliable manifolding of film heat exchanger elements because the seal must join adjacent elements, but not seal off the flow path within the heat exchanger element.

Turning to FIG. 1, a first example embodiment 100A of a membrane heat exchanger unit 100 is shown as comprising an elongated planar body 105 that includes a chamber 110 defined by a pair of coupled sheets 115, with the chamber 110 extending along the length of the body 105. The body 105 extends along an axis X, with the heat exchanger unit 100 of this example 100A having symmetry about axis X and about perpendicular axis Y.

The chamber 110 is further defined by a pair of ends 111, 112 that define ports 120 that can be respective openings to the chamber 110. As discussed herein, the ports 120 can be used to allow fluid to enter and/or exit the chamber. The pair of sheets 115 that define the chamber 110 can be coupled peripherally via seams 125 that define a peripheral edge 130 that forms the enclosed chamber 110. Additionally, the opposing sheets 115 can be further coupled via one or more seams 125 that define one or more internal couplings 135, which can be various suitable shapes.

In various embodiments, ports 120 can be defined by and extend through both sheets 115. In other words, both sheets of 115 of a pair of sheets 115 define ports 120, with an opening defined by the ports extending from a first external face of a first sheet 115 to a second opposing external face of a second sheet 115. Such a configuration can be desirable for manufacturing heat exchanger arrays 200 (see e.g., FIGS. 2-4) by coupling a plurality of heat exchanger units 100 together via respective adjacent ports 120 to generate a cavity connecting the plurality of heat exchanger units 100, which can generate one or more common fluid paths (see e.g., simplified example of FIGS. 8*a* and 8*b*) through which fluid can enter and/or exit the plurality of coupled heat exchanger units 100 that define a heat exchanger array 200. This is discussed in more detail herein.

Returning to FIG. 1, the internal couplings 135 can comprise circular seams 125 of various sizes that couple the sheets 115. The internal couplings 135 can be disposed in columns that extend parallel to axis X, with columns of internal couplings 135 becoming increasingly smaller from the peripheral edge 130 toward central axis X.

Additionally, a spine 145 can be disposed along the sides of the heat exchanger unit 100, which in some examples can be a portion of the cavity 110 defined by elongated tubes or ducts, and such spines 145 can create linear regions of limited contraction in at least one direction, which can be desirable for supporting the heat exchanger unit 100 and/or controlling the shape of the heat exchanger when inflated and/or deflated.

Although specific embodiments of membrane heat exchanger units 100 and chambers 110 are discussed above, further embodiments can have chambers 110 of any suitable size, shape and configuration, and the present examples should not be construed to be limiting on the wide variety of configurations of membrane heat exchanger units 100 that are within the scope and spirit of the present disclosure. For example, FIGS. 3-6, 9, 10*a*, 10*b*, 11*a*, 11*b*, 12*a* and 12*b* illustrate further examples of heat exchanger units 100. Additionally, while various embodiments described herein illustrate membrane heat exchanger units 100 having a heat exchanger body 105 that defines a single chamber 110 with a pair of ends 111, 112 in further embodiments, a heat exchanger body 105 can define a plurality of chambers 110.

Accordingly, various embodiments of a membrane heat exchanger unit 100 can comprise a plurality of small and thin-walled chambers 110 instead of heavy, metal tubes with soldered-on fins as in conventional heat exchanger systems. Thus, various embodiments of a membrane heat exchanger can be configured to decrease ΔT while keeping Q constant by increasing the surface area A, which can be achieved (without increases to mass and cost) by a small thickness t.

Low thermal conductivity materials can be used in some embodiments of heat exchanger units 100 by using a small thickness t. Based on hoop stress, the wall thickness required to hold a given pressure can be:

$$t = (\text{Pressure} \cdot \text{Tube radius})/\text{Material stress}$$

In various embodiments, chambers 110 of a small radius can generate a lighter and cheaper membrane heat exchanger unit 100 with better thermal conduction compared to conventional heat exchangers. For example, in various embodiments, four times as many chambers 110 of half the diameter doubles heat transfer for the same system mass/cost. Diameters of chambers 110 in the 1-10 mm range can be provided in accordance with some embodiments, with surface heat transfer coefficients h of around 50-100 W/(m²K) for air, and 5,000-10,000 W/(m²K) for flowing water and the condensing and evaporating of water.

Membrane heat exchanger units 100 can comprise various suitable materials, including polymers, and the like. For example, some embodiments can comprise polyethylene terephthalate (PET), polyethylene, polypropylene, fluoropolymers, polyimides, polyamides, and the like. In one preferred embodiment, Polyethylene terephthalate (PET) films can be used, which in some implementations can have strengths as high as 200 MPa or more and thermal conductivities k in the 0.15-0.4 W/(mK) range, depending on additives. From Equation 5, in some embodiments, a desired wall thickness is t=0.005 mm for a safe working stress of 30 MPa, tube diameter of 3 mm, and an operating pressure of 0.1 MPa (one atmosphere)(other suitable thicknesses can be employed in further embodiments). Thus k/t≈30,000-80,000 W/(m²K), is higher than the above surface heat transfer coefficients h, so by Equation 2 the relatively low thermal conductivity of a thin PET film is not a limiting factor for performance in various embodiments.

Accordingly, embodiments that employ thin film polymer membranes can enable a substantial increase in surface area and heat exchanger performance. In other words, while polymers can have lower thermal conductivities k than metal, their thickness can be made small enough that t/k is small relative to $1/h_1$ and $1/h_2$.

As discussed herein, the heat transfer rate in a membrane heat exchanger unit 100 can be directly proportional to the surface area of the membrane heat exchanger unit 100. Accordingly, increasing the surface area can increase the overall heat transfer, thereby increasing performance. In various embodiments, computer-controlled manufacturing and polymer processing can enable the fabrication of a membrane heat exchanger unit 100 with thin walls and small masses, enabling increased surface areas while maintaining effectiveness of the membrane heat exchanger unit 100.

Accordingly, various embodiments discussed herein can use thin polymeric membranes for high surface-area membrane heat exchanger units 100, loaded within appropriate safety factors of the hoop-stress limit. In some embodiments, such a configuration can be enabled via patterned chambers 110 which can be generated via laser processing of pairs of sheets as discussed herein.

Using computer-controlled manufacturing tools, a number of fabrication options are available with thin polymeric membranes, which can be amenable to rapid prototyping as well as production. Additionally, the resilience of polymeric materials enables their use in various embodiments even when processed into very thin films—i.e., films thin enough to have negligible impact on the heat transfer rate across them.

For example, the heat transfer rate, Q, across a heat exchanger can be shown to be:

$$Q = h_0 A \Delta T_{LM} = \frac{A \Delta T_{LM}}{\frac{1}{h_w} + \frac{1}{h_a} + \frac{t}{k_m}}$$

where $h_0$ is the overall heat transfer coefficient, A is the surface area of the heat exchanger, $\Delta T_{LM}$ is the logarithmic mean temperature difference across the heat exchanger, $h_w$ is the heat transfer coefficient of the hot-fluid that is being cooled, $h_a$ is the heat transfer coefficient of the cooling air, $k_m$ is the thermal conductivity of the membrane barrier wall between the two fluids, and t is the thickness of that barrier.

In some embodiments, increasing the overall heat transfer in a membrane heat exchanger unit 100 can be brought about by increasing the surface area of the membrane heat exchanger unit 100 and/or increasing the overall heat transfer coefficient. In an air-cooled heat membrane heat exchanger unit 100 the overall heat transfer coefficient can be dominated by the heat transfer coefficient of the air and there is little opportunity to increase the value of $h_o$. However, the low density and thin walls of a membrane heat exchanger unit 100 can allow the surface area to be greatly increased which can improve performance.

Numerically, $h_w \gg h_a$, so for a membrane heat exchanger unit 100 with liquid on one side and air on the other, the $1/h_w$ term is very small compared to $1/h_a$. Metals typically have good thermal conductivity (around 10-400 W/mK), so in conventional heat exchangers the $t/k_m$ term can also be ignored compared to $1/h_a$. For many polymers, thermal conductivity may be smaller, (e.g., 0.1-0.4 W/mK) but by providing a barrier less than 1 mm thick, the $t/k_m$ term is still small compared to $1/h_a$, meaning that the polymer wall will not significantly impede heat transfer through the heat exchanger compared to a metal wall. Therefore, for a given desired rate of heat transfer, $\Delta T$ can be decreased in some embodiments, provided that the surface area can be proportionally increased.

While low thermal conductivity materials can be used in heat membrane heat exchanger units 100 if their thickness is very low, the wall thickness can be specified by the requirement to withstand the pressure forcing fluid through the chamber(s) 110 of the membrane heat exchanger unit 100. Based on hoop stress, the wall thickness required to hold a given pressure is:

$$t = \frac{pr}{\sigma}$$

where p is the pressure in the tube, r is the radius of the tube, and $\sigma$ is the operating stress.

If we assume an example polymer film thickness of 0.1 mm (4 mil), high-density polyethylene (HDPE) with a maximum stress of 25 MPa and a working stress of 5 MPa, a 4 mm diameter tube can have a burst pressure of 1.25 MPa (180 psi), and a working pressure of 0.25 MPa (36 psi). Given a high-density polyethylene HDPE density of 970 kg/m$^3$ this polymer film would have a mass of 0.097 kg/m$^2$. In further embodiments, higher strength polymers can be used and/or tube diameters can be reduced. This indicates that such embodiments of membrane heat exchanger units 100 can be mechanically resilient in addition to thermally responsive.

For the air side of the heat exchanger, the heat transfer rate, Q, can constrain the air mass flow rate, m, $$Q = mc_p \Delta T_a$$

where $c_p$ is the specific heat capacity of air, and $\Delta T_a$ is the difference in temperature between the air entering and exiting the heat exchanger. Increasing mass flow across the heat exchanger surface can be accomplished through increased air velocity, but that brings with it increased power consumption, which may not be desirable. Assuming laminar flow, the power consumption of a fan can depend on the square of the linear velocity of the air, $$P = (8A\mu v^2)/d$$

where v is the air velocity through the heat exchanger, d is the effective diameter of the air flow passage, $\mu$ is the viscosity of the fluid, and A is the surface area of the heat exchanger. Increasing the heat exchanger area can increase the flow resistance and thus the fan power for a given velocity; however, the air velocity can be reduced by increasing the cross-sectional area accepting the airflow. Since fan power can be proportional to the cross sectional area but also to the square of velocity, the trade-off of increased area for decreased velocity can result in a net reduction in necessary fan power.

Figure 2:
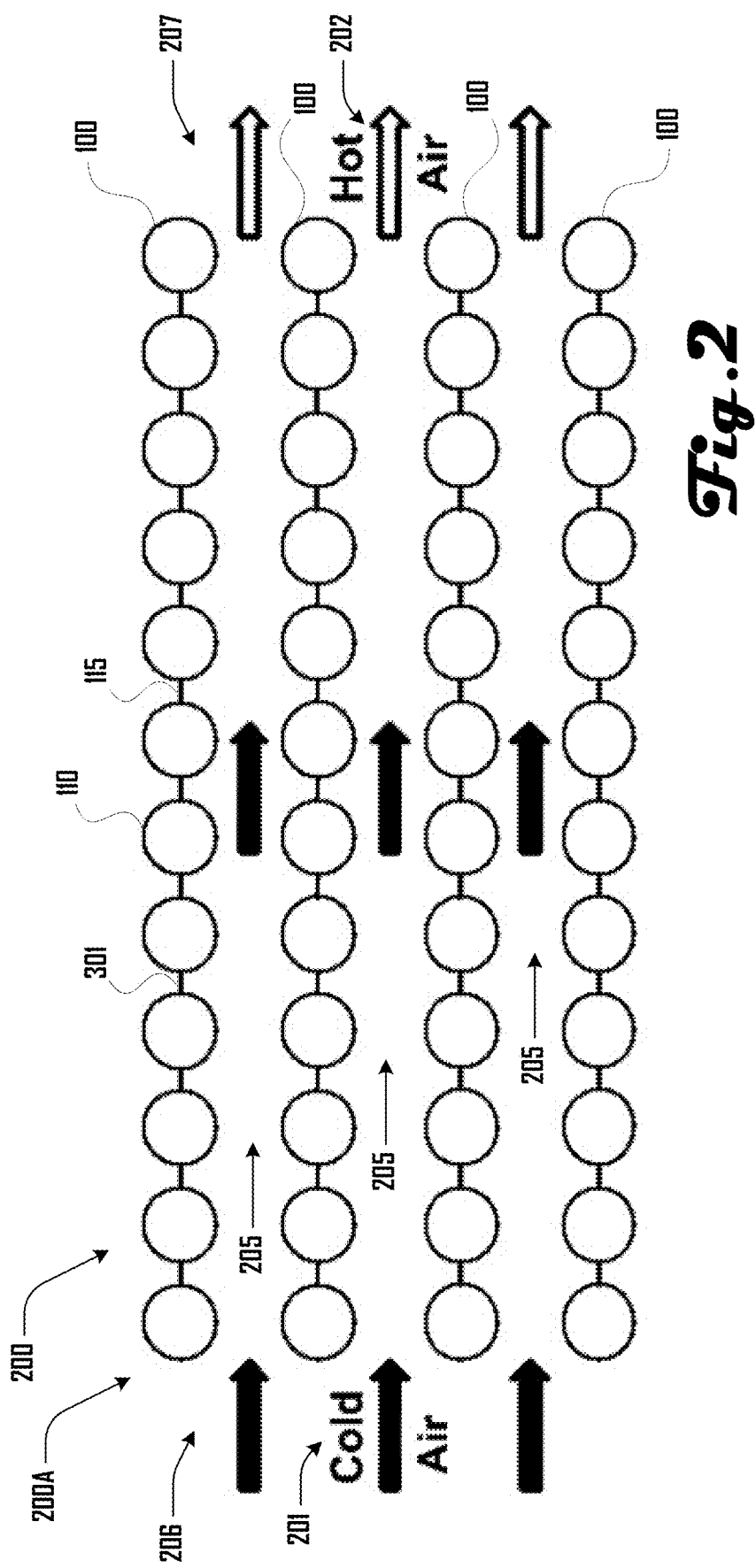
FIG. 2 illustrates a plurality of membrane heat exchanger units configured together into a cross-flow heat exchanger array, wherein the plurality of membrane heat exchanger units are stacked in parallel with a space separating each of the membrane heat exchanger units.

Turning to FIG. 2, in various embodiments, a plurality of membrane heat exchanger units 100 can be grouped together into a cross-flow heat exchanger array 200, wherein the plurality of membrane heat exchanger units 100 are stacked in parallel with a space 205 separating each of the membrane heat exchanger units 100. The heat exchanger array 200 can be configured to cool fluid that is passing through the chambers 110 of the stacked heat exchanger units 100 by having cold air 201 enter a first end 206 of the spaces 205 separating the heat exchanger units 100 such that the cold air 201 passes over the chambers 110. The cold air 201 can receive heat energy from fluid flowing within the chambers 110 of the heat exchanger units 100, which heats the cold air 201 as the cold air 201 travels through the spaces 205 separating the heat exchanger units 100 such that hot air 202 leaves from a second end 207 of the heat exchanger array 200.

Although this example illustrates air 201 being used to cool fluid passing through the chambers 110 of the stacked heat exchanger units 100, in further embodiments, any suitable fluid can be used to heat or cool various suitable fluids passing through the chambers 110. In other words, a liquid or gas can flow through the chambers 110 of a heat exchanger array 200 and be heated or cooled in various embodiments. Additionally, a liquid or gas can flow through spaces 205 of a heat exchanger array 200 to heat or cool a fluid passing through the heat exchanger units 100 in accordance with further embodiments.

Figure 3:
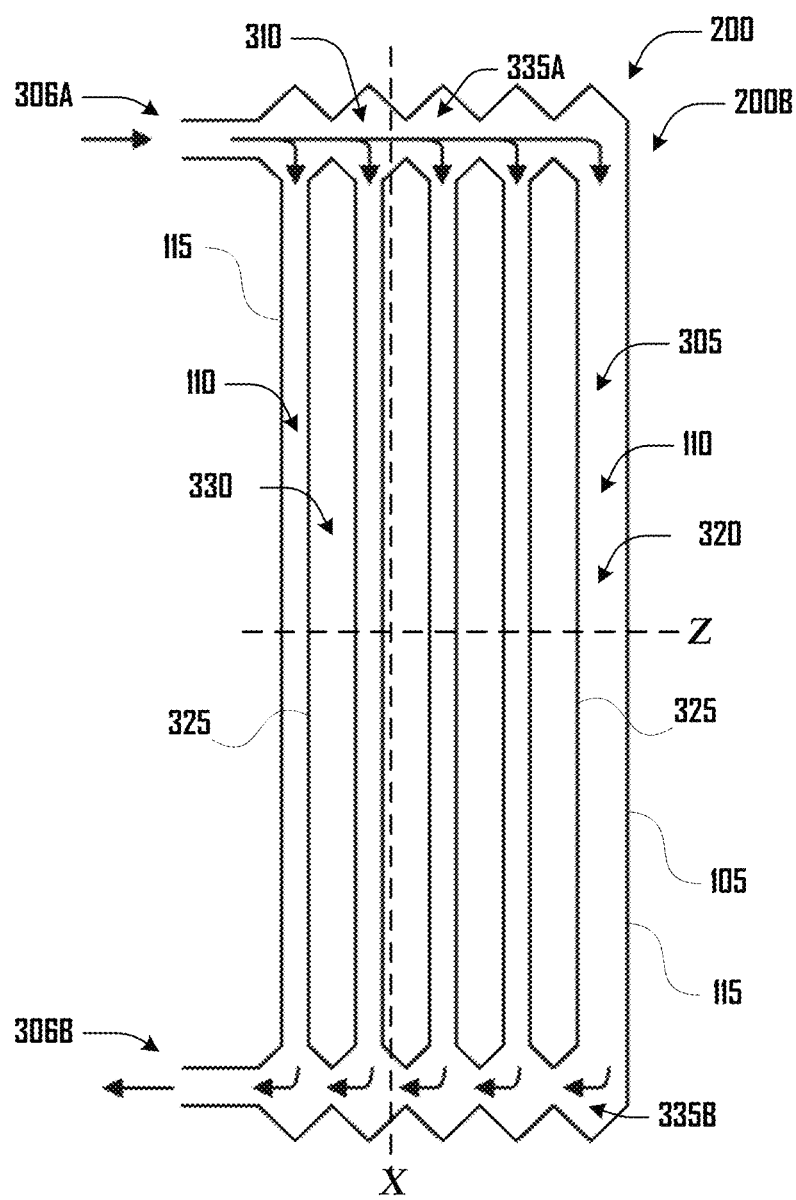
FIG. 3 illustrates a heat exchanger array with fluid being introduced into the cavity of the heat exchanger with the fluid entering the cavity at a first port and flowing through a plurality of channels of a set of heat exchanger units.

FIG. 3 illustrates an example embodiment 200B of a heat exchanger array 200 defined by a plurality of heat exchanger units 100, with fluid being introduced into a cavity 305 of the heat exchanger array 200B. This example illustrates fluid entering the cavity 305 at a first end port 306A and flowing through a plurality of channels 320 and leaving the cavity 305 via a second end port 306B as shown by the arrows in the figure. The manifold 310 can include the channels 320 and can be defined by a plurality of internal sidewalls 325 and/or one of the sheets 115 of heat exchanger units 100 that define the heat exchanger array 200.

The internal sidewalls 325 can define a plurality of internal passages 330. For example, the internal passages 330 can extend through the heat exchanger array 200B from opposing sides (e.g., along an axis Y that is perpendicular to axes X and Z). The internal passages 330 can be desirable for providing additional surface area for heat transfer between a first fluid within the cavity 305 of the heat exchanger array 200B and a second fluid surrounding the heat exchanger array 200B including the second fluid in contact with the sheets 115, the internal sidewalls 325 within the passages 330, and the like.

Additionally, a first and second conduit 335A, 335B can be disposed on opposing sides of the manifold 310 and can communicate with the end-ports 306A, 306B and the channels 320. For example, fluid can enter the first end-port 306A and flow into the first conduit 335A and into the channels 320 of the manifold 310. The fluid can flow through the manifold 320 and to the second conduit 335B, where fluid can leave the cavity 305 of the heat exchanger array 200B via the second end-port 306B.

The heat exchanger array 200B can be configured to expand along axis Z when fluid fills the cavity 305 including the channels 320. However, while the heat exchanger array 200B can be extensible along axis Z, in various embodiments, the heat exchanger array 200B can be inextensible along other axes such as axis X and/or axis Y, which are perpendicular to each other and to axis Z. Also, various portions of the heat exchanger array 200B can be rigid or flexible. For example, in some embodiment, the sheets 115 and/or internal sidewalls 325 can be rigid.

In various embodiments, end fittings can be attached to a heat exchanger array 200, (e.g., in order to generate the first and second end ports 306A, 306B), which can provide for connecting the heat exchanger array 200 to tubing and interface the heat exchanger array with the rest of a larger system. Such end fittings can be barbed, threaded or the like, and can have a flange that interfaces with holes in a sheet 115 of a heat exchanger unit 100 at an end of the heat exchanger array 200. Such end fittings can be attached to one or more sheets 115 surrounding the membrane holes (e.g., ports 120), in some embodiments, via and suitable method including ultrasonic welding, impulse welding, sealing by compressing a flexible gasket, and the like.

Figure 4:
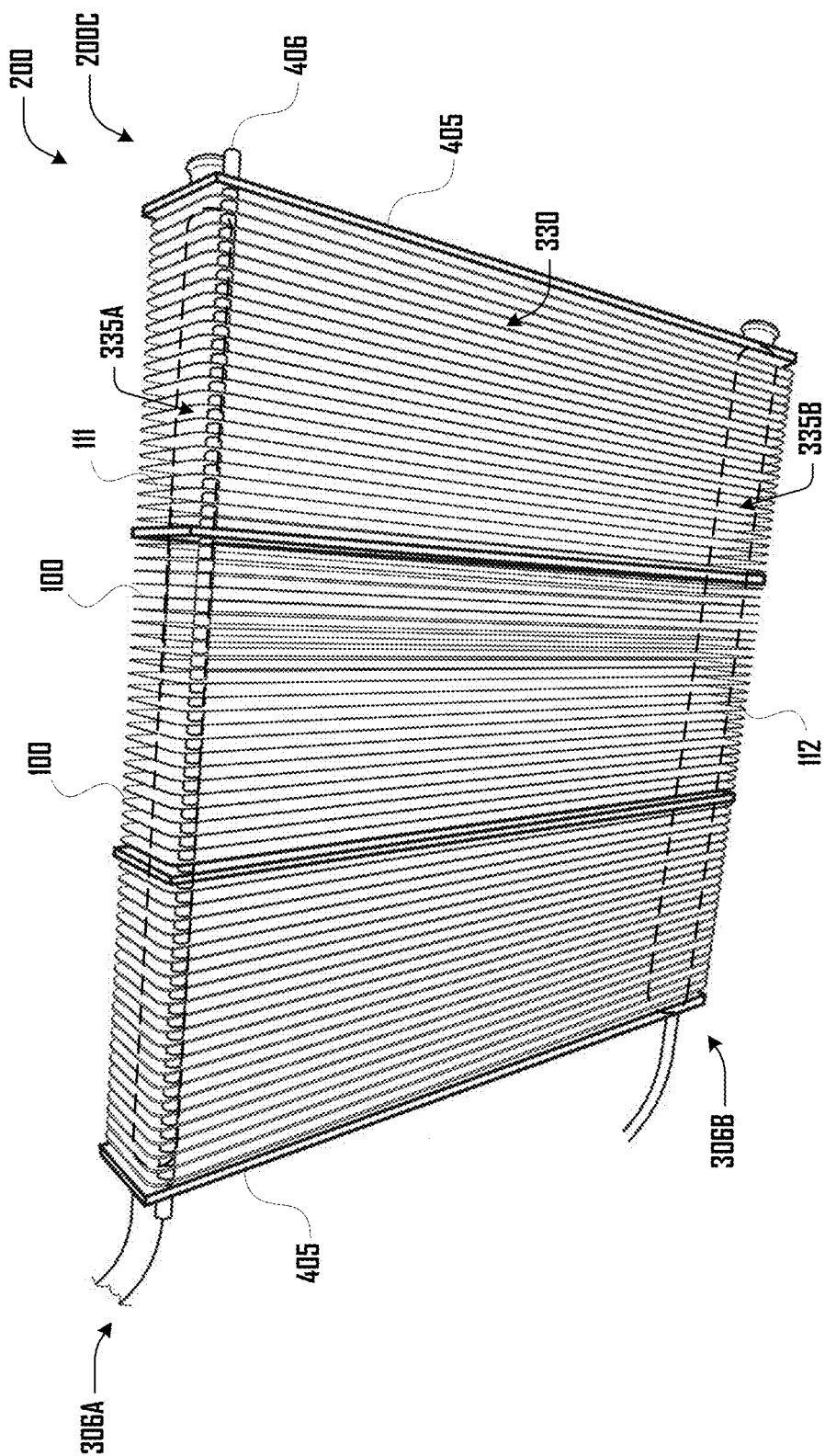
FIG. 4 is a perspective view of a heat exchanger array of another embodiment.

FIG. 4 illustrates a further embodiment 200C of a heat exchanger array 200 that comprises a plurality of stacked membrane heat exchanger units 100, which are supported within a housing 405 that can include at least one rail 406 upon which the plurality of heat exchanger units 100 hang generally in parallel. The heat exchanger array 200 further comprises fluid conduits 335A, 335B, which extend through and operably connect the heat exchanger units 100 via coupled ports 120 on opposing adjacent sides of the heat exchanger units 100 (see e.g., FIGS. 8a and 8b). For example, a flowing fluid can be received at a first fluid conduit 335A, flow into the chambers 110 of the heat exchanger units 100 via respective first ends 111, and then flow out second ends 112 into a second fluid conduit 335B. The heat exchanger units 100 can leave open an air path between them via passages 330, and are connected together at the first and second fluid conduits 335A, 335B to provide a liquid flow path.

As discussed in more detail herein, in some embodiments sheets 115 of a given heat exchanger unit 100 can be welded to adjacent sheets 115 of adjacent heat exchanger units 100 about aligned ports 120 of the heat exchanger units 100. However, where a plurality of heat exchanger units 100 having the same configuration are stacked to form a heat exchanger array 200, heat exchanger units 100 at the top and bottom of the stack may be open and not have a second adjacent heat exchanger unit 100 to couple with an outward-facing port 120. In such examples, a patch, end-port coupler, end port 306A, 306B, or the like, can be welded over the open outward-facing port(s) 120 to close the open outward-facing port(s) 120 or to attach fluid tubes to the heat exchanger array 200.

A variety of welding processes can be used to make each heat exchanger unit 100 within such a heat exchanger assembly 200, but connecting the heat exchangers 100 to each other to generate a heat exchanger assembly 200 with closed pathways for fluid communication can present a difficult problem in some embodiments. In one example process, a single layer of one sheet 115 of a first heat exchanger unit 100 is welded to the adjacent layer on the next sheet 115 of an adjacent second heat exchanger unit 100, but the two sheets 115 of the same heat exchanger unit 100 are not welded together since that would close off the liquid flow path.

In some embodiments, a spacer or other suitable element can be inserted between sheets 115 of the same heat exchanger unit 100 to prevent a weld internal in the first heat exchanger unit 100, while allowing welds to adjacent sheets 115 of a second and third heat exchanger unit 100 on opposing sides of the first heat exchanger unit 100. Spacers or other suitable elements can be inserted between sheets 115 of the second and third heat exchanger units 100, and so on, to allow for coupling of adjacent heat exchanger units 100 while preventing internal coupling of heat exchanger unit 100, which would close off a fluid path.

In embodiments using a spacer, or the like, heat used to generate a weld may then have to conduct through three layers of material (two layers of polymer sheets 115 plus the spacer) to generate the desired weld, which may require higher temperatures and potentially melting or deforming the top layer of material and affecting the quality of the next weld connection. In addition, in some examples, this would weld only one sheet 115 onto a stack at a time, which could limit the speed of the assembly process.

This issue can be solved, in some embodiments, by generating the heat for the sealing from inside the heat exchanger unit 100 while using this sealing element as a spacer to maintain the internal flow channel. This can be accomplished using various methods. In one example, a conductive element 550 comprising a strip of a patterned conductive material laminated between two layers of a nonstick material can be inserted between two sheets of plastic film before the heat exchanger element is sealed together.

Figure 5:
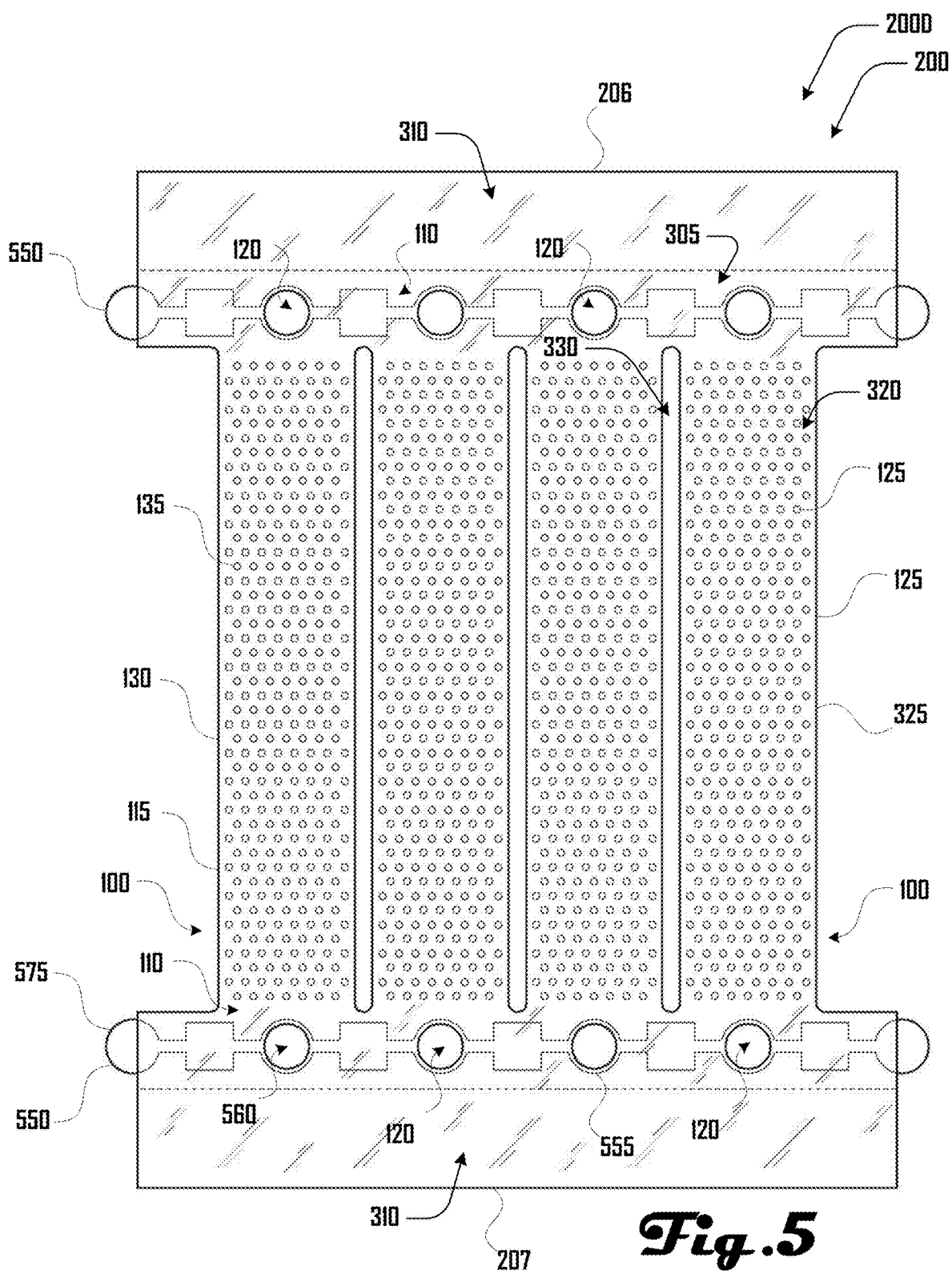
FIG. 5 is a front view of a heat exchanger array of a further embodiment.
Figure 6:
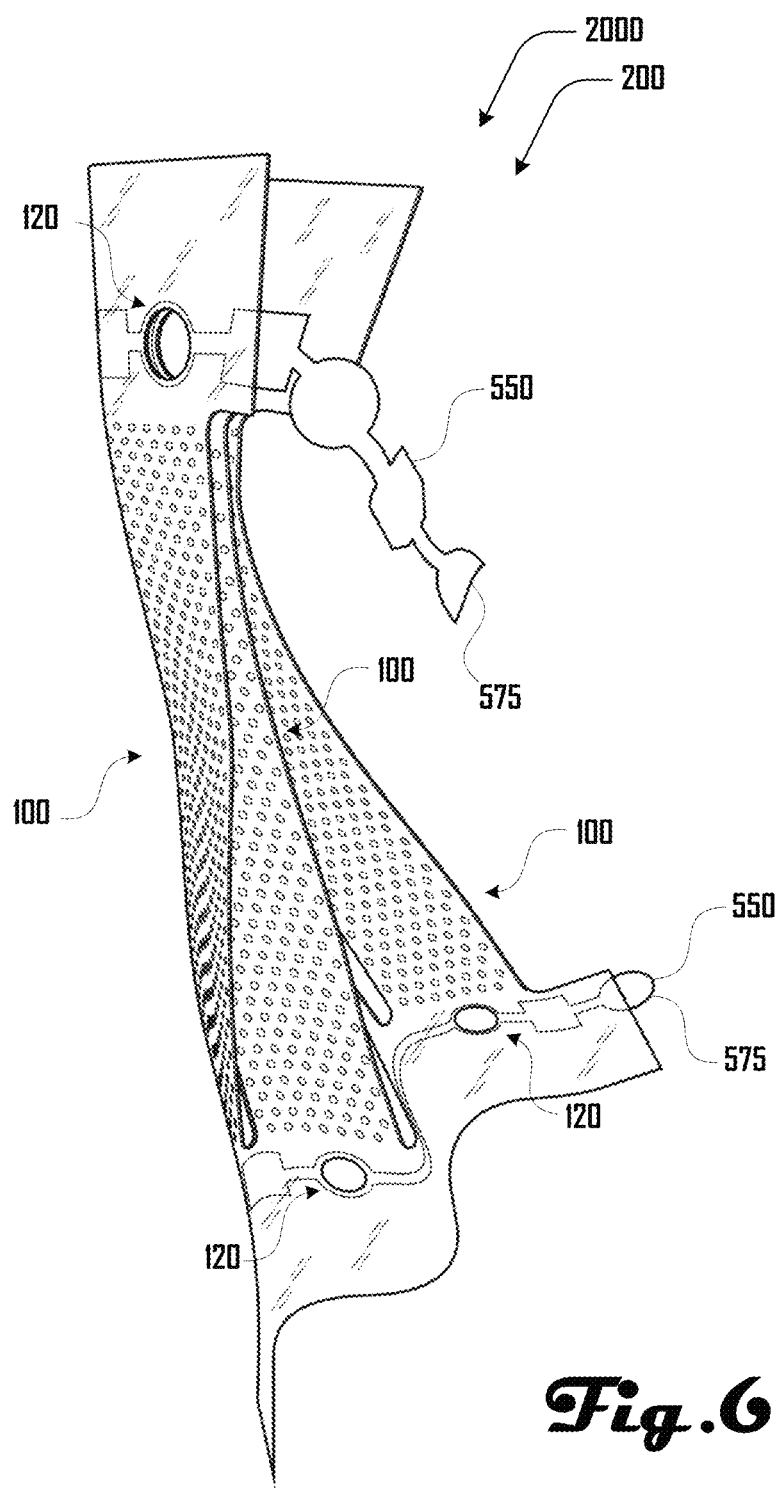
FIG. 6 is a perspective view of the heat exchanger array of FIG. 5 being folded to align open ports on the top and bottom of the heat exchanger array, which can allow portions of the heat exchanger units about the ports to be coupled via welds or other couplings.
Figure 7A:
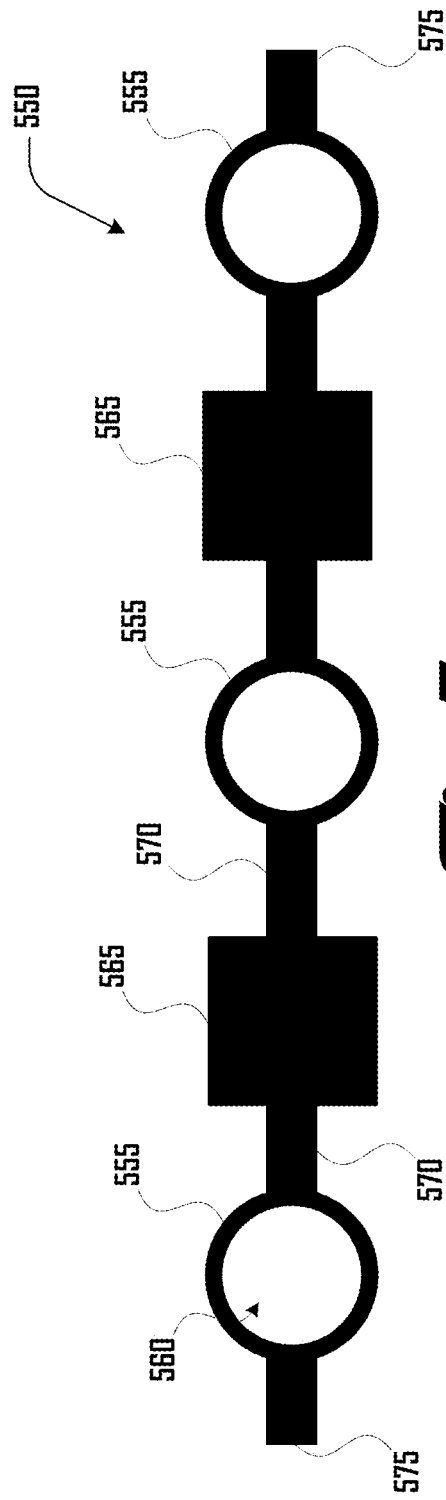
FIG. 7a illustrates an example of a conductive element comprising a strip of a patterned conductive material that can be laminated between two layers of a nonstick material.

An example of the shape of a conductive element 550 is shown in FIGS. 5, 6 and 7a, which includes an elongated strip having a plurality of thin circular elements 555 that define a central hole 560 and a plurality of rectangular larger elements 565. The thin circular elements 555 and the rectangular larger elements 565 can be coupled by connectors 570 with the thin circular elements 555 and the rectangular larger elements 565 alternatingly present along the length of the conductive element between a pair of ends 575.

The conductive element 550 material can be wide where no weld is desired and can be thin where a weld is desired. For example, the width of the thin circular elements 555 can be sized such that when a selected electric current is applied to the conductive element 550, heat is generated at the conductive element 550 of a sufficient temperature to generate a weld of polymer sheets 115. The width of the rectangular larger elements 565 and/or connectors 570 can be sized such that when the selected electric current is applied to the conductive element 550, any heat generated at the elements 565, 570 is not of a sufficient temperature to generate a weld of polymer sheets 115 and/or not of a sufficient temperature to undesirably harm the polymer sheets 115 by melting, or the like.

For example, to seal a plurality of heat exchanger units 100 together in some embodiments, the plurality of heat exchanger units 100 are folded and/or stacked onto each other and aligned. FIGS. 5 and 6 illustrate an embodiment 200D of a heat exchanger array 200 comprising a pair of sheets 115 configured and coupled to define a plurality of heat exchanger units 100 that are coupled together.

The exchanger array 200D is shown as further comprising a first and second conductive element 550 disposed between the sheets 115 at the first and second ends 206, 207 of the heat exchanger array 200, with the holes 560 of the circular elements 555 being aligned with the ports 120 and the circular elements proximate to the edges of the sheets 115 that define the ports 120. Ends 575 of the conductive element 550 are shown extending from sides of the exchanger array 200D.

As shown in FIG. 6, the heat exchanger array 200 can be folded such that the heat exchanger units 100 are disposed in a stacked adjacent configuration with the ports 120 of the respective heat exchanger units 100 aligned. In some embodiments, the ends 575 of the conductive element 550 are cut to expose a conductive layer of material. For example, where the conductive element 550 comprises a strip of a conductive material laminated between two layers of a non-conductive material, or otherwise encased in non-conductive material, the ends 575 of the conductive element 550 can be cut or the non-conductive materials can otherwise be removed or punctured to expose the conductive material.

An electrical current can be applied to the conductive material of the conductive element 550 via the ends 575 or other suitable location, and because thin sections of the conductive element 550 (e.g., the thin circular elements 555) can have higher resistance than other portions of the conductive element 550 (e.g., the larger elements 565 and/or connectors 570), greater heat can be dissipated in the thinner sections at a temperature sufficient to generate a weld between adjacent sheets 115 of adjacent heat exchanger units 100 without a weld being generated at other portions of the conductive element 550 (e.g., the larger elements 565 and/or connectors 570). Meanwhile, nonstick material surrounding the conductive element 550 can shield the internal path of the conductive element 550 from sealing shut.

A seal can thus be formed between adjacent sheets 115 of adjacent heat exchanger units 100 without generating a weld between the two sheets 115 of a single heat exchanger unit 100. An example of the structure of a resulting coupling of adjacent ports 120 of adjacent heat exchanger units 100 is shown in FIGS. 8a and 8b. (Note that the majority of the structures of the simplified example heat exchanger units 100 in FIGS. 8a and 8b are removed in this illustration for clarity, such as the main body of the heat exchanger unit 100, a second port 120, and the like.) Accordingly, the coupling of sheets 115 of adjacent heat exchanger units 100 about the ports 120 can convert the open ports 120 into respective first and second conduits 335A, 335B (see e.g., FIG. 3) that communicate with each of the channels 320 of the heat exchanger units 100 and allow fluid to flow through the first conduit 335A, through the channels 320 of the heat exchanger units 100 to the second conduit 335B as discussed herein.

While one specific embodiment of a heat exchanger array 200D and conductive element 550 is shown in FIGS. 5, 6 and 7a, it should be clear that other embodiments are within the scope and spirit of this invention and that this example should not be construed as being limiting. For example, while the heat exchanger units 100 in this embodiment 200 are shown as being connected, in further embodiments, the heat exchanger units 100 can be separate elements that are stacked and coupled about the ports 120 to generate connections between respective heat exchanger units 100. Additionally, various other suitable methods can be used to couple heat exchanger units 100 about the ports 120.

Figure 7B:
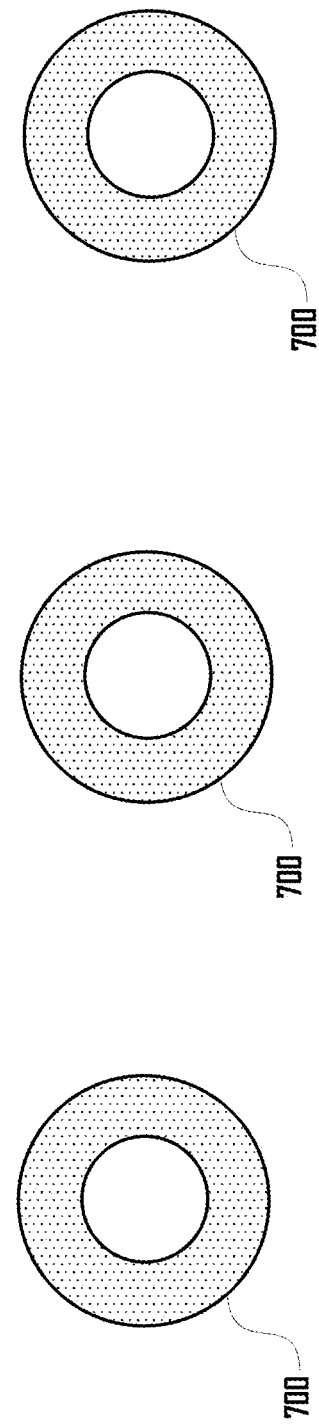
FIG. 7b illustrates a set of patches which can be used in some embodiments to generate welds between polymer sheets.

For example, another embodiment can include using patches of a similar design inserted between pairs of sheets 115 of respective heat exchanger units 100 such as annular patches of conductive material that would cover the area to be sealed (e.g., about the ports 120). Such a patch (e.g., a set of patches 700 as shown in FIG. 7b similar to the thin circular elements 555), can be constructed out of aluminum foil between two layers of a high-temperature non-stick such as Teflon™ (PTFE) tape, or the like.

Figure 9:
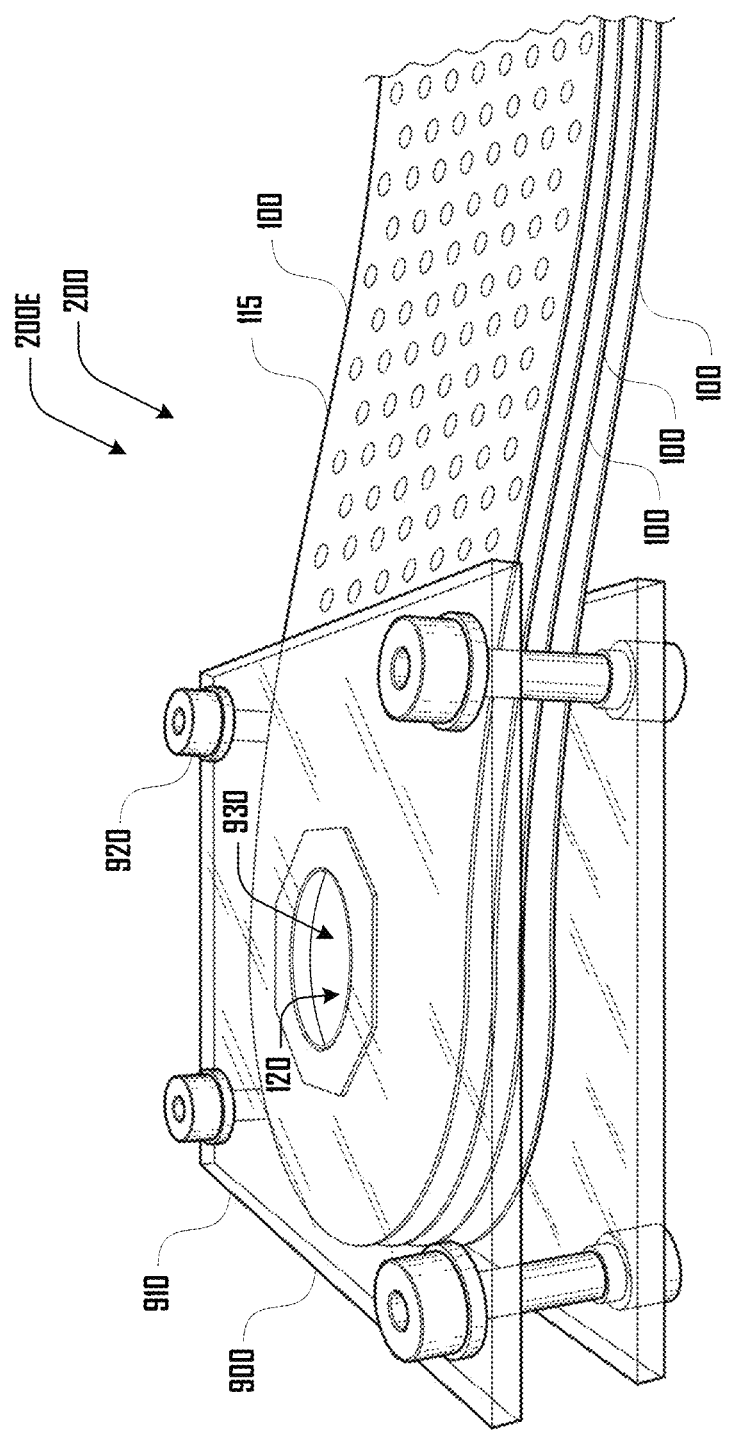
FIG. 9 illustrates heat exchanger units disposed in a stacked configuration and held within a clamp assembly with the ports of respective heat exchanger units being aligned.

A stack of example heat exchanger units 100 of an embodiment 200E of a heat exchanger array 200 being formed is illustrated in FIG. 9 having a circular border weld and inserted patches 700 as described herein. The heat exchanger units 100 are disposed in a stacked configuration and held within a clamp assembly 900 with the ports 120 of respective heat exchanger units 100 being aligned. The clamp assembly 900 comprises a pair of plates 910 between which the stacked heat exchanger units 100 are held, with clamping pressure being applied by bolts 920 that extend between the plates 910. An opening 930 is defined by at least one of the plates 910, which communicates with the aligned ports 120 of the respective heat exchanger units 100.

A solenoid can be inserted into the opening 930 and aligned ports 120 and a current (e.g., a high frequency alternating current) can be applied to the solenoid coil. A changing magnetic flux through the center of the conductive patches 700 encircling the ports 120 can induce a current in the patches that can resistively heat the patches 700 to generate a weld between adjacent sheets 115 of adjacent heat exchanger units 100 without coupling the pair of sheets 115 of a given heat exchanger unit 100 as described herein. Pressure applied by the clamp 900 can improve the welds between adjacent sheets 115 of adjacent heat exchanger units 100.

Because the same current can be induced all the way around the annular patches 700 in various embodiments, heating can be uniform in some examples as long as the thickness of the material of the patches 700 is uniform all the way around. The magnetic field can be uniform along the length of the solenoid (e.g., where the solenoid has sufficient length) and the change in magnetic flux can be the same in each patch 700 in various examples, so the process can be consistent along a large stack of heat exchanger units 100 that define a heat exchanger array 200.

Another example embodiment can use an inserted material (analogous to patches 700 and/or conductive element 550) with a high susceptance. In embodiments where a polymer that defines heat exchanger units 100 is non-polar, such a polymer may not heat significantly when exposed to microwave radiation, while a high-susceptibility material will be heated. Several heat exchanger units 100 can be stacked together and then exposed to microwaves to generate heating of the high-susceptance material, which can generate a weld of adjacent sheets 115 of adjacent heat exchanger unit 100, but not between the sheets 115 of an individual heat exchanger unit 100 as discussed herein.

In various embodiments, elements used to generate heat and form welds between adjacent sheets 115 of adjacent heat exchanger unit 100, but not between the sheets 115 of an individual heat exchanger unit 100 can remain in a heat exchanger assembly 200 generated by such a method, including in a final product made from the heat exchanger array 200 and during use of the heat exchanger array 200 such as when fluid is run through the heat exchanger array 200 to perform heat exchange. For example, patches 700 and/or conductive elements 550 can remain in a generated heat exchanger assembly 200 and not be removed. Such a manufacturing method can be desirable as it can reduce the complexity, time and cost of manufacturing by alleviating the need for a removal step. For example, FIG. 8 shows a welded stack of films with the heat seal elements still inside. However, in some embodiments, the entirety of such heat seal elements or portions thereof can be removed after generation of a weld.

While some embodiments include welding many manifold junctions or ports 120 at once, further embodiments can include welding only one or a few junctions at a time, which can allow for greater control over the quality of each weld as well as the use of off-the-shelf welding equipment.

FIG. 10a illustrates a side cross-sectional view and perspective view of a heat exchanger unit 100 comprising a pair of sheets 115 coupled peripherally via seams 125 that define a peripheral edge 130 that forms the enclosed chamber 110. Additionally, the opposing sheets 115 can be further coupled via one or more seams 125 that define one or more internal coupling 135. The sheets 115 further define ports 120 at ends of the heat exchanger unit 100, which are shown being open.

FIG. 10b illustrates a first and second heat exchanger unit 100A, 100B in a stacked configuration with the ports 120 of the respective heat exchanger units 100 being aligned and a heating element 1000 having first and second portions 1010A, 1010B inserted into an open end of the first and second heat exchanger unit 100A, 100B. The heating element can be configured to apply heat via one or both of the first and second portions 1010A, 1010B to selected portions of the sheets 115 that define adjacent ports 120 of the respective heat exchanger. Specifically, a first port 120A of the first heat exchanger unit 100A and a second port 120B of the second heat exchanger unit 100B. Heat applied by the heating element 1000 can generate a weld about the first and second ports 120A, 120B as described herein. Additionally, the first and second portions 1010A, 1010B of the heating element 1000 can be pressed together to apply force to the portions of the sheets 115 being welded, which can improve the quality of the weld. Alternatively, a separate tool can be used to apply pressure or pressure need not be applied to the area being welded.

FIG. 11a illustrates the first and second portions 1010A, 1010B of the heating element 1000 being applied to the open end of the second heat exchange unit 100B where the weld was applied about the first and second ports 120A, 120B as shown in FIG. 10b. The first and second portions 1010A, 1010B of the heating element 1000 applied to the open end of the second heat exchange unit 100B can generate a weld to the end of the second heat exchange unit 100B to close and seal the end of the second heat exchange unit 100 as shown in FIG. 11b.

A weld can also be similarly applied to the first heat exchange unit 100 to close the open end of the second heat exchange unit 100B where the weld was applied about the first and second ports 120A, 120B as shown in FIG. 10b. Similar welds can be applied to the other end of the first and second heat exchanger units 100A, 100B.

Also, while a first and second heat exchanger unit 100A, 100B are shown in the example of FIGS. 10b, 11a and 11b, further examples can include any suitable plurality of heat exchanger unit. Additionally, in some embodiments, multiple welds can be created at once on one or more heat exchanger unit 100 or heat exchanger assembly 200 by using more than one heating element 1000 in parallel.

The heating element 1000 or other suitable element can apply or generate heat to make welds in various suitable ways including, via resistive heating elements embedded in the first and second portions 1010A, 1010B, inductive heating, susceptance heating, ultrasonic, laser welding and the like.

In some embodiments, having openings that allow for access to the welding region can include flaps rather than slots in the end of the heat exchange units 100. For example, a flap can be folded back to expose a region that is to be welded to a heat source that is applied from above (e.g., via laser or ultrasonic welding, or the like). Then, a U-shaped weld may be required in some embodiments to seal the end(s) (rather than a linear weld) in order to seal the sides and end of the flap.

Such interior methods of heat sealing can allow for several desirable properties in heat exchangers units 100 and heat exchanger arrays 200. For example, in some embodiments, there is no need for the use of adhesives which may, in some embodiments, react poorly to high temperatures over long periods of time or have difficulty bonding to low surface energy materials like polyolefin films. The heat seal can have similar properties to the rest of the thermal welds in the heat exchanger unit 100, and the behavior of the heat seal can thus be more predictable in some examples. In addition, various methods can remove the requirement for any kind of rigid spacer placed inside the heat exchanger manifold in order to clamp elements against each other while maintaining a fluid flow path.

In various examples, pouches can be made of monolayer films of a polyolefin such as polypropylene or polyethylene. In that case, an appropriate welding temperature can be anywhere between 110° C. and 200° C. depending on the material properties and the duration of the weld. In some cases a multilayer laminate may be used instead, with outer layer(s) composed of weldable polyolefins and a layer with a higher melting point such as polyethylene terephthalate, polyamide, or aluminum. An adhesive layer may be required to bond the polyolefin layer(s) to the layer with higher melting point in various examples.

For example, in some embodiments, a multilayer laminate can comprise a thin aluminum layer (e.g., foil or metallized) that can be used to prevent permeation. One side of the aluminum can have a sealant layer (e.g., polyethylene, polypropylene, or the like) that is easy to weld, and that can become the inside of heat exchanger units 100. The other side of such a laminate can have a protective layer to protect the aluminum layer. Such a protective layer can be the outer layer of heat exchanger units 100, so having an outer protective layer that makes it easy to couple heat exchanger units 100 together (e.g., as discussed herein) can be desirable. While some embodiments can include an aluminum layer, further embodiments can include one or more layer of any suitable metal, alloy, or the like.

In some embodiments, multilayer films or laminates having a metallic layer, the metallic layer can act as a welding element, such that in some examples, additional welding elements need not be present aside from the metallic layer. In other words, in some embodiments, additional metallic welding elements can be absent or replaced by a metallic layer of multilayer sheets 115 of heat exchanger units 100, which can be used to weld the heat exchanger units 100 together.

For example, in one embodiment, an aluminum foil layer in a laminate can be induction-heated with a solenoid coil (e.g., similar to implant induction welding as discussed herein). A non-stick spacer or silicone film can be applied between the walls of each individual heat exchanger unit 100 to avoid welding shut the heat exchanger units 100 as discussed herein. Since a far-field magnetic field strength decreases with increasing distance from the field source, the induction coil setup can be designed such that only specific areas close to the coil where welding is desired are heated. The structure of the multilayer film can also be optimized to melt the exterior walls of the heat exchanger units 100 without melting or burning the internal layers.

Though heat sealing offers a number of advantages in terms of performance, it can come with significant challenges related to manufacturing in some embodiments. Therefore, it may be desirable to manifold the heat exchanger units 100 together using techniques that do not require heat. For example, the connections between adjacent heat exchanger units 100 in a heat exchanger array 200 can be made using an adhesive, double-sided tape, hot-melt adhesive, glue or the like. In some embodiments, connections can be non-permanent, with a seal created by applying normal force to a flexible gasket material.

For example, FIG. 12*a* illustrates another embodiment 200G of a heat exchanger array 200 having a first and second heat exchanger unit 100A, 100B in a stacked configuration with the ports 120 aligned and with the respective sheets 115 about the ports 120 of respective sheets 115 coupled via an adhesive 1210 (hot-melt adhesive, or double sided tape, or the like). Other coupled portions of the sheets 115 of the heat exchanger units 100 can be coupled via a weld, adhesive 1210, hot-melt adhesive, or the like.

FIG. 12*b* illustrates a further embodiment 200H of a heat exchanger array 200 having a first and second heat exchanger unit 100A, 100B in a stacked configuration with the ports 120 aligned and with the respective sheets 115 about the ports 120 of respective sheets 115 coupled about the ports via a gasket 1220 with a clamp assembly 1230 applying sealing pressure to the gasket 1220 to generate a seal.

In this example, the clamp assembly 1230 comprises porous spacers 1240 disposed within the cavity 110 defined by sheets 115 of the heat exchanger units 100A, 100B with the spacers 1240 extending between and engaging the sheets 115 about ports 120 of the heat exchanger units 100A, 100B. Nuts 1250 on opposing sides of the heat exchanger units 100A, 100B apply pressure to the spacers 1240, which in turn apply pressure to the gasket 1220 and generate a seal about the ports 120 of the heat exchanger units 100A, 100B. A porous tube 1260 extends through the nuts 1250, the spacers 1240, gasket 1220 and ports 120.

Accordingly, the heat exchanger array 200H can operate by fluid entering the cavities 110 of the heat exchanger units 110A, 110B at a first end via the porous tube 1260 and porous spacers 1240, with the porous tube 1260 further allowing fluid to communicate through the ports 120. The fluid can travel from a first end to a second end of the heat exchanger array 200H and exit the heat exchanger array via porous tube 1260 and porous spacers 1240 at the second end as fluid enters the heat exchanger array 200H at the first end of the heat exchanger array 200H.

Further embodiments can include a spring between the nuts 1250 and the sheets 115 of the heat exchanger units 100, in order to allow for a greater degree of control in the compressive force than would be possible by tightening nuts 1250. The spacers 1240 can comprise variety of porous materials including but not limited to: washers with radial holes drilled through them; washers cut from woven and non-woven fabrics (with or without a stiffer outer layer laminated to them); washers cut from corrugated plastic; and the like. As discussed herein, while only two heat exchanger units 100A, 110B are shown in the example of FIGS. 12*a* and 12*b*, further embodiments can comprise any suitable plurality of heat exchanger units 100.

In various embodiments, welding between sheets 115 can be accomplished without heat, by depositing a solvent that solvates a polymer of the sheets 115 onto the region to be welded. The solvent can be deposited in either liquid, vapor form, or the like. Such a solvent can be deposited on the region where adhesive would otherwise be used. Examples of solvents can include Cyclohexane, Methylene dichloride, Ethylene dichloride, Acetone, n-Hexanol, 1,2 Dichloroethane, Methyl benzene, and the like.

As discussed herein, some embodiments can include the insertion of a separate element into the inside of the heat exchanger units 100 of a heat exchanger array 200, whether that element be a porous spacer 1240, a metal ring 700 for induction welding, or the like. Such an insert element can be inserted into the heat exchanger units 100 by various suitable methods such as: (1) including the element between the sheets 115 of the heat exchanger units 100 before the sheets 115 are welded together, (2) bending the insert element so that it fits through a hole of one or more heat exchanger element 100 (e.g., one or more ports 120), and (3) leaving an end of a heat exchanger unit 100 un-welded and inserting the insert element through the open end, before later welding closed the open end of the heat exchanger element.

Various embodiments can include one or more of: ultrasonic welding through barrier layer; laser transmission welding; using coextruded film with polar outer layer or lower temp melting point outer layer for thermal welding, or just using laminated layer of lower melt temp material on outside of the manifold region; using drilled/injection molded spacers with foil laminated onto the faces; using drilled/injection molded spacers with gaskets; using drill/injection molded spacers that are made of a material with greater heat resistance than the membranes that are to be welded; inserting heated rod and using conductive or radiative heat transfer, shielding using either spacers or films; and/or using a coex/laminated patch.

Figure 13:
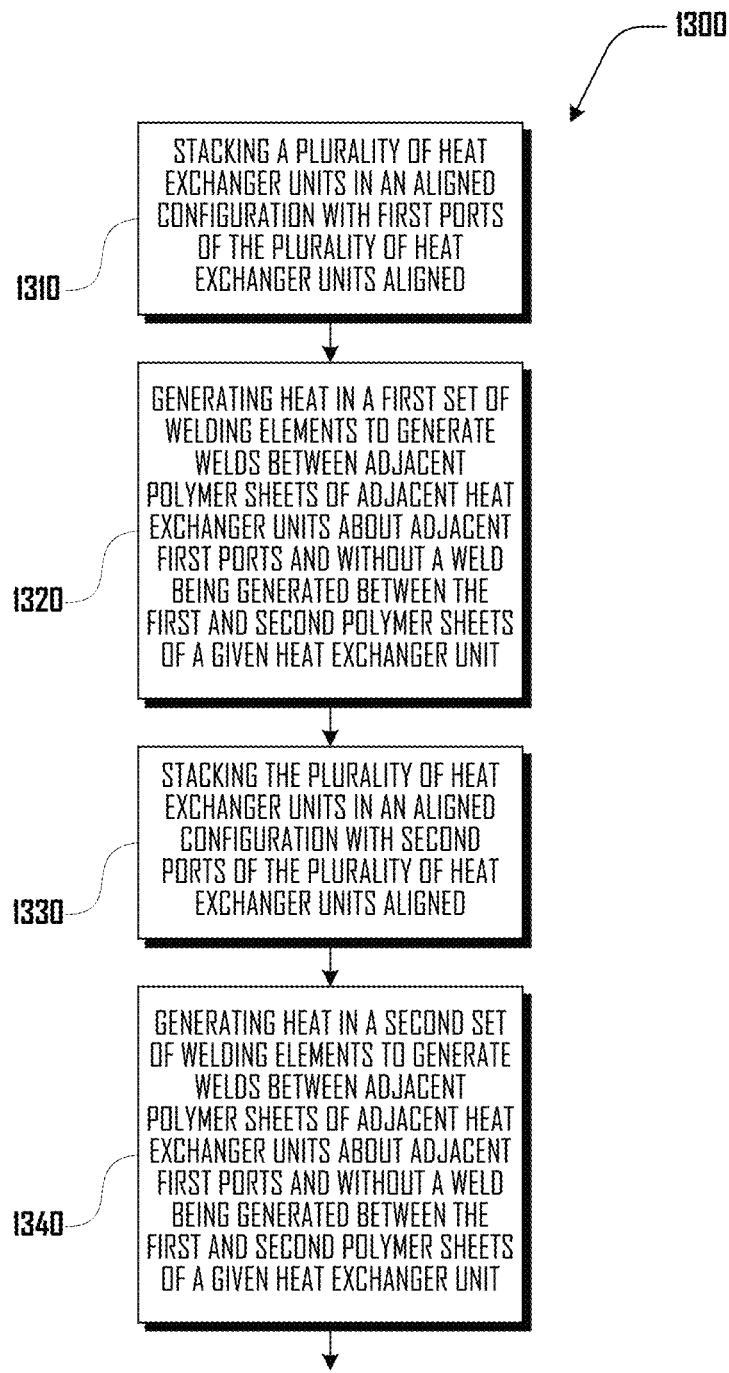
FIG. 13 illustrates an example method of generating a heat exchanger array in accordance with an embodiment.

FIG. 13 illustrates an example method 1300 of generating a heat exchanger array 200 in accordance with an embodiment. The method 1300 begins at 1310 with stacking a plurality of heat exchanger units 100 in an aligned configuration with first ports 120A of the plurality of heat exchanger units 100 aligned.

Heat exchanger units 100 can be configured in various suitable ways including heat exchanger units 100 shown and described herein. For example, each of the heat exchanger units 100 can have a first end 111 and second end 112 with a first and second polymer sheet 115 welded together at a plurality of edges 130 to define a cavity 110 between the first and second polymer sheets 115, the cavity 110 being elongated extending between the first and second ends 111, 112 with an opposing first and second face defined respectively by the first and second polymer sheets 115. The heat exchanger units 100 can include a first port 120A at the first end 111 of the heat exchanger unit 100 defined by the first and second polymer sheets 115, the first port 120 being an opening that extends between the first and second faces at the first end 111. The heat exchanger units 100 can also include a second port 120B at the second end 112 of the heat exchanger unit 100 defined by the first and second polymer sheets 115, the second port 120B being an opening that extends between the first and second faces at the second end 112. The heat exchanger units can include a first welding element disposed about the first port 120 between the first and second polymer sheets 115 within the cavity 110; and a second welding element disposed about the second port 120B between the first and second polymer sheets 115 within the cavity 110.

For example, the first and second welding elements can include conductive elements 550 and/or patches 700, or the like as described herein, including elements that generate heat when exposed to an electrical current, a magnetic flux, microwave energy, or the like. Returning to FIG. 13, the method 1300 continues to 1320 where heat is generated in a first set of welding elements to generate welds between adjacent polymer sheets 115 of adjacent heat exchanger units 100 about adjacent first ports 120A and without a weld being generated between the first and second polymer sheets 115 of a given heat exchanger unit 100.

At 1330, the plurality of heat exchanger units 100 are stacked in an aligned configuration with second ports 120B of the plurality of heat exchanger units 100 aligned. At 1340, heat is generated in a second set of welding elements to generate welds between adjacent polymer sheets 115 of adjacent heat exchanger units 100 about adjacent first ports 120B and without a weld being generated between the first and second polymer sheets 115 of a given heat exchanger unit 100.

The method 1300 can be used to generate various embodiments of a heat exchanger array 200 including heat exchanger arrays 200 shown in FIGS. 2-6, 9 and the like. In some examples, welds generated simultaneously about the first ports 120A and the second ports 120B can be generated at different times or can be generated simultaneously. For example, in one embodiment, current can be applied to first and second sets of welding elements at the first ports 120A and the second ports 120B simultaneously.

Welds can be generated in various suitable ways with various suitable materials. For example, welds can include welds between polymer sheets 115. A weld in accordance with various embodiments can be the joining together of two or more separate elements by heating portions of the two or more separate elements to the point of melting such that the melted portions merge while melted and then cool to generate a unitary solid structure that integrally joins the two or more separate elements.

In contrast, preventing a weld, without welding or a non-weld can include heating of one or more separate elements, and such one or more elements may be heated to the point of melting; however, the elements do not or are prevented from merging while melted and do not generate a unitary solid structure that integrally joins the two or more separate elements. In other words, the one or more separate elements remain separate, even if such one or more separate elements are exposed to heat, melt, and/or cool and solidify from a melted state.

In some examples, spacers and/or a nonstick material can be used to prevent welds. For examples, such nonstick materials can interface with first and second areas where one or both of the first and second areas are melted to form one or more welds with one or more additional areas (e.g., a third and fourth areas). However, the nonstick materials can prevent coupling or welding of the first and second areas to each other including a coupling via the nonstick material or spacer, while the weld to the one or more additional areas is generated.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives. Additionally, elements of one example embodiment should not be construed to be limited to that specific example embodiment. Accordingly, any suitable element of an example embodiment can be applied or used in other example embodiments, and any suitable element can be removed or absent from a given example embodiment.

What is claimed is:

1. A method of manufacturing a heat exchanger array, the method comprising:
    generating a plurality of heat exchanger units that include:
        a first and second end;
        a first and second polymer sheet welded together at a plurality of edges to define a cavity between the first and second polymer sheets, the cavity being elongated extending between the first and second ends, the first and second polymer sheets defined by a multilayer laminate that comprises:
            a thin aluminum layer having a first and second side;
            a sealant layer laminated on the first side of the thin aluminum layer, the sealant layer comprising at least one of polyethylene and polypropylene; and
            a protective layer laminated on the second side of the thin aluminum layer to protect the thin aluminum layer;
        an opposing first and second face defined respectively by the first and second polymer sheets;
        a first port at the first end of the heat exchanger unit defined by the first and second polymer sheets, the first port being an opening that extends between the first and second faces at the first end;
        a second port at the second end of the heat exchanger unit defined by the first and second polymer sheets, the second port being an opening that extends between the first and second faces at the second end;
        a first welding element disposed about the first port between the first and second polymer sheets within the cavity, the first welding element defined by the thin aluminum layer; and
        a second welding element disposed about the second port between the first and second polymer sheets within the cavity;
    stacking the plurality of heat exchanger units in an aligned configuration with the first ports of the plurality of heat exchanger units aligned;
    generating heat in the first welding elements at the same time and at a temperature sufficient to generate a first plurality of respective welds between adjacent polymer sheets of adjacent heat exchanger units about adjacent first ports and without a weld being generated between the first and second polymer sheets of a given heat exchanger unit, wherein the generating heat in the first welding elements at the same time comprises applying a magnetic flux to the thin aluminum layer by inserting a solenoid through a set of aligned first ports and generating the magnetic flux with the solenoid while the solenoid is disposed within the set of aligned first ports;
    stacking the plurality of heat exchanger units in an aligned configuration with the second ports of the plurality of heat exchanger units aligned; and
    generating heat in the second welding elements at the same time and at a temperature sufficient to generate a second plurality of respective welds between adjacent polymer sheets of adjacent heat exchanger units about adjacent second ports and without a weld being generated between the first and second polymer sheets of a given heat exchanger unit.

2. The method of claim 1 wherein the plurality of heat exchanger units are coupled as a unitary structure before generation of the first and second plurality of welds; and
    wherein the stacking the plurality of heat exchanger units in an aligned configuration with the first ports of the plurality of heat exchanger units aligned comprises folding the unitary structure so that the plurality of heat exchanger units defined by the unitary structure are disposed in the aligned configuration with the first ports of the plurality of heat exchanger units aligned.

3. The method of claim 1, wherein the first welding elements comprise a heating element surrounded by a nonstick material, the nonstick material preventing a weld being generated between the first and second polymer sheets of a given heat exchanger unit while the heat is generated in the first welding elements and the nonstick material facilitating the first plurality of respective welds between adjacent polymer sheets of adjacent heat exchanger units about adjacent first ports.

4. The method of claim 1, further comprising the first and second welding elements remaining in the heat exchanger array during use of the heat exchanger array when fluid is run through the heat exchanger array to perform a heat exchange process.

5. The method of claim 1, wherein the generating heat in the first welding elements at the same time comprises:
simultaneously applying a magnetic flux to the plurality of first welding elements to induce a current in the plurality of first welding elements that resistively generates the heat in the first welding elements sufficient to generate the first plurality of respective welds.

6. The method of claim 5, wherein the plurality of first welding elements comprise a conductive material and are electrically coupled via at least one of a plurality of conductive material connections, the plurality of conductive material connections allowing the current to be applied to the plurality of first welding elements simultaneously.

7. The method of claim 6, wherein an elongated conductive strip comprises the plurality of first welding elements, the first welding elements having a size that allows the plurality of first welding elements to generate the welds when the current is applied to the plurality of first welding elements and the plurality of conductive material connections having a size such that further welds are not generated in a plurality of locations where the conductive material connections contact the polymer sheets of the plurality of heat exchanger units.

8. A method of manufacturing a heat exchanger array, the method comprising:
stacking a plurality of heat exchanger units in an aligned configuration with respective first ports of the plurality of heat exchanger units aligned, the heat exchanger units of the plurality of heat exchanger units including:
a first and second end;
a first and second sheet coupled together to define a cavity between the first and second sheets, the first and second sheets each defined by a multilayer laminate that comprises:
a thin aluminum layer having a first and second side;
a sealant layer laminated on the first side of the thin aluminum layer, the sealant layer comprising at least one of polyethylene and polypropylene; and
a protective layer laminated on the second side of the thin aluminum layer to protect the thin aluminum layer;
the first port at the first end of the heat exchanger unit defined by the first and second sheets;
a second port at the second end of the heat exchanger unit defined by the first and second sheets;
a first coupling element disposed about the first port between the first and second sheets within the cavity and defined by the thin aluminum layer; and
a second coupling element disposed about the second port between the first and second sheets within the cavity; and
generating heat in the first coupling elements at the same time and at a temperature sufficient to generate a first plurality of respective couplings between adjacent sheets of adjacent heat exchanger units about adjacent first ports and without a coupling being generated between the first and second sheets of a given heat exchanger unit, wherein the generating heat in the first coupling elements at the same time comprises applying a magnetic flux to the thin aluminum layer by inserting a solenoid through a set of aligned first ports and generating the magnetic flux with the solenoid while the solenoid is disposed within the set of aligned first ports.

9. The method of claim 8, further comprising:
stacking the plurality of heat exchanger units in an aligned configuration with the second ports of the plurality of heat exchanger units aligned; and
generating heat in the second coupling elements at the same time and at a temperature sufficient to generate a second plurality of respective couplings between adjacent sheets of adjacent heat exchanger units about adjacent second ports and without a coupling being generated between the first and second sheets of a given heat exchanger unit.

10. The method of claim 8, wherein first and second sheets are defined by a polymer sheet and
wherein generating heat in the first coupling elements at the same time and at the temperature generates a first plurality of respective welds between adjacent polymer sheets of adjacent heat exchanger units about adjacent first ports and without a weld being generated between the first and second sheets of a given heat exchanger unit.

11. The method of claim 8 wherein the plurality of heat exchanger units are coupled as a unitary structure before generation of the first and second plurality of couplings; and
wherein the stacking the plurality of heat exchanger units in an aligned configuration with the first ports of the plurality of heat exchanger units aligned comprises folding the unitary structure so that the plurality of heat exchanger units defined by the unitary structure are disposed in the aligned configuration with the first ports of the plurality of heat exchanger units aligned.

12. The method of claim 8, further comprising the first and second coupling elements remaining in the heat exchanger array during use of the heat exchanger array when fluid is run through the heat exchanger array to perform a heat exchange process.

13. The method of claim 8, wherein the first coupling elements comprise a heating element surrounded by a nonstick material, the nonstick material preventing a coupling being generated between the first and second sheets of a given heat exchanger unit while the heat is generated in the first coupling elements and the nonstick material facilitating the first plurality of respective coupling between adjacent sheets of adjacent heat exchanger units about adjacent first ports.

14. The method of claim 13, wherein the nonstick material comprises PTFE.

15. The method of claim 8, wherein the generating heat in the first coupling elements at the same time comprises:
simultaneously applying a magnetic flux to the plurality of first coupling elements to induce a current in the plurality of first coupling elements that resistively generates the heat in the first coupling elements sufficient to generate the first plurality of respective couplings.

16. The method of claim 15, wherein the plurality of first coupling elements comprise a conductive material and are electrically coupled via at least one of a plurality of conductive material connections, the plurality of conductive material connections allowing the current to be applied to the plurality of first coupling elements simultaneously.

17. The method of claim 16, wherein an elongated conductive strip comprises the plurality of first coupling elements, the first coupling elements having a size that allows the plurality of first coupling elements to generate the couplings when the current is applied to the plurality of first coupling elements and the plurality of conductive material connections having a size such that further couplings are not generated in a plurality of locations where the conductive material connections contact the sheets of the plurality of heat exchanger units.

* * * * *